US012229601B2

(12) United States Patent
Park

(10) Patent No.: US 12,229,601 B2
(45) Date of Patent: Feb. 18, 2025

(54) ELECTRONIC APPARATUS AND CONTROLLING METHOD THEREOF

(71) Applicant: Samsung Electronics Co., Ltd., Suwon-si (KR)

(72) Inventor: Jeonghoon Park, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 18/320,646

(22) Filed: May 19, 2023

(65) Prior Publication Data
US 2023/0289232 A1   Sep. 14, 2023

Related U.S. Application Data

(63) Continuation of application No. 17/222,509, filed on Apr. 5, 2021.

(30) Foreign Application Priority Data

Apr. 6, 2020 (KR) .................. 10-2020-0041596

(51) Int. Cl.
G06F 9/46 (2006.01)
G05D 1/00 (2006.01)
(Continued)

(52) U.S. Cl.
CPC ......... *G06F 9/5038* (2013.01); *G05D 1/0219* (2013.01); *G05D 1/0274* (2013.01);
(Continued)

(58) Field of Classification Search
CPC .................................................. G06F 9/5038
See application file for complete search history.

(56) References Cited

U.S. PATENT DOCUMENTS 7,162,509 B2   1/2007  Brown et al.
8,385,823 B2   2/2013  Naniyat
(Continued)

FOREIGN PATENT DOCUMENTS

CN         105516260 A    4/2016
KR   10-2010-0048917 A    5/2010
(Continued)

OTHER PUBLICATIONS

Non-final Office Action dated Jul. 5, 2023, in connection with U.S. Appl. No. 17/222,509, 8 pages.
(Continued)

*Primary Examiner* — Gregory A Kessler

(57) ABSTRACT

Provided herein are an electronic apparatus and a controlling method thereof. An electronic apparatus according to the disclosure includes a communicator, a memory storing information on a recipe wherein a plurality of unit functions for provision of a service are combined, and a processor configured to, based on receiving information for a unit function that can be performed at each electronic apparatus from each of a plurality of electronic apparatuses through the communicator, identify a plurality of electronic apparatuses matched to the plurality of unit functions included in the recipe based on the received information, and control the communicator to transmit a signal for performing each matched unit function to each of the plurality of identified electronic apparatuses.

18 Claims, 18 Drawing Sheets

(51) Int. Cl.
  *G05D 1/246* (2024.01)
  *G05D 1/648* (2024.01)
  *G06F 3/0484* (2022.01)
  *G06F 9/50* (2006.01)
(52) U.S. Cl.
  CPC .............. *G05D 1/246* (2024.01); *G05D 1/648* (2024.01); *G06F 3/0484* (2013.01)

(56) References Cited

U.S. PATENT DOCUMENTS

| | | | |
|---|---|---|---|
| 8,553,625 | B2 | 10/2013 | Shao et al. |
| 8,782,122 | B1 | 7/2014 | Chang |
| 8,843,063 | B2 | 9/2014 | Naniyat |
| 10,778,830 | B2 | 9/2020 | Jang et al. |
| 10,812,542 | B2 | 10/2020 | Jeon et al. |
| 10,893,401 | B2 | 1/2021 | Naniyat |
| 2009/0104875 | A1 | 4/2009 | Naniyat |
| 2013/0165043 | A1 | 6/2013 | Naniyat |
| 2014/0118123 | A1 | 5/2014 | Lim et al. |
| 2014/0206284 | A1 | 7/2014 | Naniyat |
| 2014/0223028 | A1* | 8/2014 | Peng .................. G06F 16/1794 709/246 |
| 2016/0156682 | A1 | 6/2016 | Jeon et al. |
| 2016/0173624 | A1 | 6/2016 | Lee |
| 2017/0078160 | A1 | 3/2017 | Hong et al. |
| 2017/0366927 | A1 | 12/2017 | Naniyat |
| 2019/0132436 | A1 | 5/2019 | Jang et al. |
| 2019/0173832 | A1 | 6/2019 | Yu et al. |
| 2019/0202062 | A1 | 7/2019 | Park et al. |
| 2019/0238358 | A1 | 8/2019 | Hurewitz |
| 2019/0394063 | A1 | 12/2019 | Cho et al. |
| 2020/0022072 | A1 | 1/2020 | Cho et al. |

FOREIGN PATENT DOCUMENTS

| | | |
|---|---|---|
| KR | 10-2014-0055321 A | 5/2014 |
| KR | 10-1495915 B1 | 2/2015 |
| KR | 10-2016-0064853 A | 6/2016 |
| KR | 10-2019-0047445 A | 5/2019 |

OTHER PUBLICATIONS

International Search Report and Written Opinion of the International Searching Authority in connection with International Application No. PCT/KR2021/004200 issued Jul. 15, 2021, 7 pages.

European Patent Office, "Supplementary European Search Report," dated Dec. 16, 2022, in connection with European Patent Application No. 21785017.1, 9 pages.

* cited by examiner

FIG. 12A

```
                                        1210
{
 [
  {    "unit_function_name" : "camera",
       "service_url" : http://mobile_ip:10101/camera,
       "capability" : {
          "resolution": "1920*1080",
          "fps": 60,
       }
       "method" : "GET",
       "response": "binary image"
  },
  {    "unit_function_name" : "display",
       "service_url" : ws://mobile_ip:10102,
       "capability" : {
          "resolution": "1920*1080",
       }
       "method" : "websocket"
  },
  {    "unit_function_name" : "object segmentation",
       "service_url" : http://mobile_ip:10103,
       "capability" : {
          "fps": 3,
       }
       "method" : "POST",
       "request" : "binary image",
       "response": "binary image"
  }
 ],
}
```

```
{
 [
  {    "unit_function_name" : "camera",
       "service_url" : http://rvc_ip:10101/camera,
       "capability" : {
         "resolution": "320*240",
         "fps": 30,
       }
       "method" : "GET",
       "response": "binary image"
  },
  {    "unit_function_name" : "movable",
       "service_url" : http//rvc_ip:10102,
       "method" : "POST",
       "request" : "a position to move",
       "response": "OK or not"
  },
  {    "unit_function_name" : "indoor_location",
       "service_url" : http://rvc_ip:10103,
       "method" : "GET",
       "response": "json message for current position"
  }
 ],
}
```

```
{
  [
    {   "unit_function_name" : "display",
        "service_url" : ws://tv_ip:10102,
        "capability" : {
          "resolution": "7680*4320",
        }
        "method" : "websocket"
    },
    {   "unit_function_name" : "object_recognition",
        "service_url" : http//tv_ip:10102,
        "capability" : {
           "fps": 5,
        }
        "method" : "POST",
        "response": "json message indicating recognized object"
    },
    {   "unit_function_name" : "indoor_map",
        "service_url" : http://tv_ip:10103,
        "method" : "POST",
        "request" : "a position to display object and
                    a name of the object",
        "response": "OK or not"
    }
  ],
}
```

```
Recipe (YAML) pseudo code
jobs:
   get_current_position_from_sources :
     -run :
        GET current position FROM indoor location@data_sources
   move_position_by_control_sources :
     -run :
        POST a position to move TO movable@control_sources
        GET a captured image FROM camera@data_sources
   analyse_object_by_processor_sources
     -run :
        POST the captured image TO object segmentation@processor_sources to get a
segmented image
        POST the segmented image TO object recognition@processor_source to get a
name of a object in the segmented image
   present_object_by_presentation_sources
     -run :
        POST the name of the object TO indoor map@presentation_sources
workflows:
   find_objects:
     requires:
       control_sources:
         -movable
       data_sources:
         -camera
           requires: movable
               priority : high resolution
         -indoor location
             requires: movable
       processor_sources
         -object segmentation
         priority : high fps
         -object recognition
              priority : high fps
       presentation_sources
         -indoor map
     jobs:
       loop :
           -get_current_position_from_sources
           -move_position_by_control_sources
           -analyse_object_by_processor_sources
           -present_object_by_presentation_sources
```

ELECTRONIC APPARATUS AND CONTROLLING METHOD THEREOF

CROSS-REFERENCE TO RELATED APPLICATIONS

This application is a continuation of application Ser. No. 17/222,509, filed Apr. 5, 2021, which is based on and claims priority under 35 U.S.C. § 119(a) of a Korean patent application number 10-2020-0041596, filed on Apr. 6, 2020 in the Korean Intellectual Property Office, the disclosures of which are incorporated by reference herein in their entirety.

BACKGROUND

1. Field

The disclosure relates to an electronic apparatus and a controlling method thereof, and more particularly, to an electronic apparatus that provides a service by controlling another electronic apparatus connected via a network, and a controlling method thereof.

2. Description of Related Art

In general, an electronic apparatus is manufactured to include hardware that can perform a specific function, and the electronic apparatus can provide a specific service to a user by performing the specific function.

However, a function that can be performed at an electronic apparatus can be limited according to the type and the performance, etc. of hardware. Also, in case a function required for provision of another service is a function that cannot be performed by an electronic apparatus, there is a problem that it is impossible for the electronic apparatus to provide another service.

In this case, for providing another service, there is an option of replacing an electronic apparatus with another electronic apparatus including hardware that can provide the another service, or replacing or adding some hardware of the electronic apparatus, but there is a problem that cost or time is spent.

SUMMARY

The disclosure was devised for addressing the aforementioned need, and the purpose of the disclosure is in providing an electronic apparatus that provides a service by controlling another electronic apparatus connected via a network, and a controlling method thereof.

An electronic apparatus according to an embodiment of the disclosure for achieving the aforementioned purpose may include a communicator, a memory storing information on a recipe including a plurality of unit functions for provision of a service, and a processor configured to, based on receiving information for a unit function that can be performed at each electronic apparatus from each of a plurality of electronic apparatuses through the communicator, identify a plurality of electronic apparatuses matched to the plurality of unit functions included in the recipe based on the received information, and control the communicator to transmit a signal for performing each matched unit function to each of the plurality of identified electronic apparatuses.

Meanwhile, the processor may identify whether the plurality of unit functions included in the recipe exist among the plurality of unit functions included in the received information, and based on identifying that the plurality of unit functions included in the recipe exist, identify a plurality of electronic apparatuses matched to the plurality of unit functions included in the recipe among the plurality of electronic apparatuses.

Meanwhile, the processor may, based on a second unit function performed in association with a first unit function included in the recipe existing, identify a first electronic apparatus that can perform the first unit function and the second unit function among the plurality of electronic apparatuses as an electronic apparatus matched to the first unit function and the second unit function.

Meanwhile, the memory may further store requirement information that indicates a second unit function performed in association with at least a first function among the plurality of unit functions included in the recipe for provision of the service. Also, the processor may, based on the requirement information, identify whether the second unit function performed in association with a unit function exists with respect to each of the plurality of unit functions included in the recipe.

Meanwhile, the processor may, based on identifying a plurality of electronic apparatuses that can perform a unit function of which priority has been set among the plurality of unit functions included in the recipe, calculate the score of each of the plurality of identified electronic apparatuses based on performance information of a unit function that can be performed at each electronic apparatus received from each of the plurality of identified electronic apparatuses, and identify an electronic apparatus having the highest calculated score among the plurality of identified electronic apparatuses as an electronic apparatus matched to the unit function of which priority has been set.

Meanwhile, the processor may control the communicator to transmit a signal for performing a first unit function among the plurality of unit functions included in the recipe to a first electronic apparatus matched to the first unit function among the plurality of identified electronic apparatuses, and control the communicator to transmit a signal for performing a second unit function among the plurality of unit functions included in the recipe based on data acquired according to performing the first unit function to a second electronic apparatus matched to the second unit function among the plurality of identified electronic apparatuses.

Meanwhile, the data acquired according to performing the first unit function may be transmitted from the first electronic apparatus to the second electronic apparatus, or from the first electronic apparatus to the second electronic apparatus through the electronic apparatus.

Meanwhile, the electronic apparatus according to the disclosure may further include a display, and the processor may, based on identifying the plurality of electronic apparatuses, control the display to display a user interface (UI) indicating that provision of the service corresponding to the recipe is possible.

Meanwhile, the UI may include an object for executing the recipe, and the processor may, based on receiving a user command selecting the object, control the communicator to transmit a signal for performing each matched unit function to each of the plurality of identified electronic apparatuses.

Meanwhile, information on the recipe may be received from a server through the communicator and stored in the memory.

Meanwhile, a controlling method of an electronic apparatus according to an embodiment of the disclosure may include the steps of receiving information for a unit function that can be performed at each electronic apparatus from each of a plurality of electronic apparatuses, identifying a plurality of electronic apparatuses matched to the plurality of unit functions included in a recipe for provision of a service based on the received information, and transmitting a signal for performing each matched unit function to each of the plurality of identified electronic apparatuses.

Meanwhile, the step of identifying a plurality of electronic apparatuses may include the steps of identifying whether the plurality of unit functions included in the recipe exist among the plurality of unit functions included in the received information, and based on identifying that the plurality of unit functions included in the recipe exist, identifying a plurality of electronic apparatuses matched to the plurality of unit functions included in the recipe among the plurality of electronic apparatuses.

Meanwhile, in the step of identifying a plurality of electronic apparatuses, based on second unit function performed in association with a first unit function included in the recipe existing, a first electronic apparatus that can perform the first unit function and the second unit function among the plurality of electronic apparatuses may be identified as an electronic apparatus matched to the first unit function and the second unit function.

Meanwhile, the controlling method may further include the step of, based on requirement information that indicates the second unit function performed in association with at least first function among the plurality of unit functions included in the recipe for provision of the service, identifying whether the second unit function performed in association with a unit function exists with respect to each of the plurality of unit functions included in the recipe.

Meanwhile, the controlling method may include the steps of, based on identifying a plurality of electronic apparatuses that can perform a unit function of which priority has been set among the plurality of unit functions included in the recipe, calculating the score of each of the plurality of identified electronic apparatuses based on performance information of a unit function that can be performed at each electronic apparatus received from each of the plurality of identified electronic apparatuses, and identifying an electronic apparatus having the highest calculated score among the plurality of identified electronic apparatuses as an electronic apparatus matched to the unit function of which priority has been set.

Meanwhile, the transmitting step may further include the steps of transmitting a signal for performing a first unit function among the plurality of unit functions to a first electronic apparatus that can perform the first unit function among the plurality of identified electronic apparatuses, and transmitting a signal for performing a second unit function among the plurality of unit functions based on data acquired according to performing the first unit function to a second electronic apparatus that can perform the second unit function among the plurality of electronic apparatuses.

Meanwhile, the data acquired according to performing the first unit function may be transmitted from the first electronic apparatus to the second electronic apparatus, or from the first electronic apparatus to the second electronic apparatus through the electronic apparatus.

Meanwhile, the controlling method according to the disclosure may further include the step of, based on identifying the plurality of electronic apparatuses, displaying a user interface (UI) indicating that provision of the service corresponding to the recipe is possible.

Meanwhile, the UI may include an object for executing the recipe, and the step of transmitting a signal may include the step of, based on receiving a user command selecting the object, transmitting a signal for performing each matched unit function to each of the plurality of identified electronic apparatuses.

Meanwhile, information on the recipe may be received from a server and stored in the memory of the electronic apparatus.

According to the various embodiments of the disclosure as described above, an electronic apparatus that provides a service by controlling another electronic apparatus connected via a network, and a controlling method thereof can be provided.

Also, even in case an electronic apparatus of a user cannot perform a unit function required for a service, the electronic apparatus can provide the service by interlocking with another electronic apparatus that can perform the unit function among other electronic apparatuses connected via a network. Accordingly, the service can be provided without consumption of cost and time according to replacing the electronic apparatus itself or hardware.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 12A is a diagram for illustrating information on unit functions according to an embodiment of the disclosure;

FIG. 12B is a diagram for illustrating information on unit functions according to an embodiment of the disclosure;

FIG. 12C is a diagram for illustrating information on unit functions according to an embodiment of the disclosure;

FIG. 13 is a diagram for illustrating information on a recipe according to an embodiment of the disclosure;

DETAILED DESCRIPTION

Figure 1:
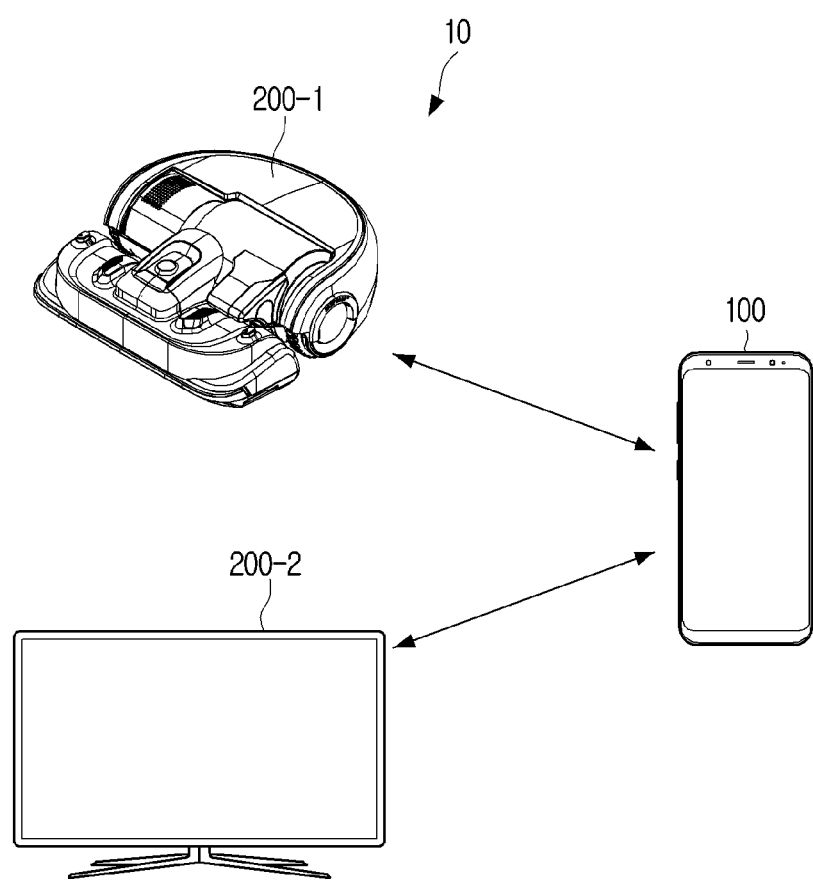
FIG. 1 is a diagram for illustrating a system according to an embodiment of the disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In describing the disclosure, in case it is determined that detailed explanation of related known functions or features may unnecessarily confuse the gist of the disclosure, the detailed explanation will be omitted. In addition, the embodiments below may be modified into several different forms, and the scope of the technical idea of the disclosure is not limited to the embodiments below. Rather, these embodiments are provided to make the disclosure more sufficient and complete, and to fully convey the technical idea of the disclosure to those of ordinary skill in the technical field to which the disclosure pertains.

The embodiments of the disclosure are not for limiting the technology described in the disclosure to a specific embodiment, but they should be interpreted to include various modifications, equivalents, and/or alternatives of the embodiments of the disclosure. Also, with respect to the description of the drawings, similar components may be designated by similar reference numerals.

In addition, the expressions "first," "second," and the like used in the disclosure may be used to describe various elements regardless of any order and/or degree of importance. Also, the expressions are used only to distinguish one element from another element, and are not intended to limit the elements.

Further, in the disclosure, expressions such as "A or B," "at least one of A and/or B," and "one or more of A and/or B" may include all possible combinations of the listed items. For example, "A or B," "at least one of A and B," or "at least one of A or B" may refer to all of the following cases: (1) including at least one A, (2) including at least one B, or (3) including at least one A and at least one B.

Also, in the disclosure, singular expressions include plural expressions, unless defined obviously differently in the context. Further, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

In addition, the description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element). In contrast, the description that one element (e.g.: a first element) is "directly coupled" or "directly connected" to another element (e.g.: a second element) can be interpreted to mean that still another element (e.g.: a third element) does not exist between the one element and the another element.

Further, the expression "configured to" used in the disclosure may be interchangeably used with other expressions such as "suitable for," "having the capacity to," "designed to," "adapted to," "made to" and "capable of," depending on cases. Meanwhile, the term "configured to" does not necessarily mean that a device is "specifically designed to" in terms of hardware. Instead, under some circumstances, the expression "a device configured to" may mean that the device "is capable of" performing an operation together with another device or component. For example, the phrase "a processor configured to perform A, B, and C" may mean a dedicated processor (e.g.: an embedded processor) for performing the corresponding operations, or a generic-purpose processor (e.g.: a CPU or an application processor) that can perform the corresponding operations by executing one or more software programs stored in a memory device.

An electronic apparatus according to the various embodiments of the disclosure may include, for example, at least one of a smartphone, a tablet personal computer (PC), a mobile phone, a video phone, an e-book reader, a desktop personal computer (PC), a laptop personal computer (PC), a netbook computer, a workstation, a server, a personal digital assistant (PDA), a portable multimedia player (PMP), an MP3 player, a mobile medical instrument, a camera, or a wearable device. According to the various embodiments of the disclosure, a wearable device may include at least one of an accessory-type device (e.g.: a watch, a ring, a bracelet, an ankle bracelet, a necklace, glasses, a contact lens, or a head-mounted-device (HMD)), a device integrated with fabrics or clothing (e.g.: electronic clothing), a body-attached device (e.g.: a skin pad or a tattoo), or a bioimplant device (e.g.: an implantable circuit).

Also, in some embodiments, an electronic apparatus may be a home appliance. A home appliance may include, for example, at least one of a television, a digital video disk (DVD) player, an audio, a refrigerator, an air conditioner, a cleaner, an oven, a microwave oven, a washing machine, an air cleaner, a set-top box, a home automation control panel, a security control panel, a TV box (e.g.: Samsung HomeSync™, Apple TV™, or Google TV™), a game console (e.g.: Xbox™, PlayStation™), an electronic dictionary, an electronic key, a camcorder, or an electronic photo frame.

In another embodiment, an electronic apparatus may include at least one of various types of medical instruments (e.g.: various types of portable medical measurement instruments (a blood glucose meter, a heart rate meter, a blood pressure meter, or a thermometer, etc.), magnetic resonance angiography (MRA), magnetic resonance imaging (MRI), computed tomography (CT), a photographing device, or an ultrasonic instrument, etc.), a navigation device, a global navigation satellite system (GNSS), an event data recorder (EDR), a flight data recorder (FDR), a vehicle infotainment device, an electronic device for vessels (e.g.: a navigation device for vessels, a gyrocompass, etc.), avionics, a security device, a head unit for a vehicle, an industrial or a household robot, an automatic teller's machine (ATM) of a financial institution, a point of sales (POS) of a store, or an Internet of things (IoT) device (e.g.: a light bulb, various types of sensors, an electronic or gas meter, a sprinkler device, a fire alarm, a thermostat, a street light, a toaster, exercise equipment, a hot water tank, a heater, a boiler, etc.).

According to still another embodiment, an electronic apparatus may include at least one of a part of furniture or a building/a structure, an electronic board, an electronic signature receiving device, a projector, or various types of measurement apparatuses (e.g.: water, electricity, gas, or radio wave measurement apparatuses, and the like). In various embodiments of the disclosure, an electronic apparatus may be a combination of one or more of the aforementioned various types of apparatuses. Meanwhile, an electronic apparatus according to an embodiment of the disclosure may be a flexible electronic apparatus. Also, an electronic apparatus according to an embodiment of the disclosure is not limited to the aforementioned apparatuses, and may include a new electronic apparatus according to development of technologies.

FIG. 1 is a diagram for illustrating a system according to an embodiment of the disclosure.

Referring to FIG. 1, a system 10 according to an embodiment of the disclosure may include a plurality of electronic apparatuses 100, 200-1, 200-2. Meanwhile, the plurality of electronic apparatuses 100, 200-1, 200-2 may include the electronic apparatus 100 and the other electronic apparatuses 200-1, 200-2.

The plurality of electronic apparatuses 100, 200-1, 200-2 may be connected with one another via a network through various communication methods. For example, communication methods may be wired communication methods such as Serial, Universal Serial Bus (USB), Ethernet, etc., or wireless communication methods such as Bluetooth, Zigbee, Wi-Fi (WiFi), Near Field Communication (NFC), Infrared Ray, Long Range (LoRa), long-term evolution (LTE), LTE Advance (LTE-A), 5th Generation (5G), etc. that use signals of specific frequency bands (or specific wavelengths).

One electronic apparatus among the plurality of electronic apparatuses 100, 200-1, 200-2 may transmit (send) data to another electronic apparatus connected via a network, or receive data from another electronic apparatus connected via a network. Specifically, the plurality of electronic apparatuses 100, 200-1, 200-2 may transmit and receive data according to rules (e.g.: a transmission order of data and an expression method of data, etc.) defined in protocols used in various communication methods. For example, protocols may include at least one of a HyperText Transfer Protocol (HTTP), an eXtensible Messaging and Presence Protocol (XMPP), a Constrained Application Protocol (CoAP), a Message Queuing Telemetry Transport (MQTT), an Advanced Message Queuing Protocol (AMQP), a Transmission Control Protocol (TCP), a Web Socket, a Simple Network Management Protocol (SNMP), etc.

The electronic apparatus 100 may refer to an apparatus that can interact with a user by various methods. For example, the electronic apparatus 100 may receive an input from a user through various input methods such as a voice, a touch, a motion, a key input, etc. of the user, and the electronic apparatus 100 may provide information to the user through various output methods such as a display, a speaker, a vibration haptic, etc. The electronic apparatus 100 may be implemented as, for example, a smartphone as in FIG. 1.

The other electronic apparatuses 200-1, 200-2 may provide at least one service having a use specialized for the other electronic apparatuses 200-1, 200-2 to a user. For example, in the case of a robot cleaner, it may provide a cleaning service to a user, and in the case of a TV, it may provide an image viewing service to a user.

For this, the other electronic apparatuses 200-1, 200-2 may perform a function for providing a service to a user. Here, a function may include at least one unit function, and a unit function may refer to a subordinate unit constituting a function.

A unit function of the other electronic apparatuses 200-1, 200-2 according to an embodiment of the disclosure may refer to an operation performed by using the hardware of the other electronic apparatuses 200-1, 200-2. For example, in case the first electronic apparatus 200-1 is a robot cleaner as in FIG. 1, it may perform an automatic cleaning function for provision of a cleaning service. Here, an automatic cleaning function may include a first unit function of moving a location to another location through a moving device (e.g.: a wheel, a rotation axis, etc.) provided on the first electronic apparatus 200-1 (referred to as a moving function), a second unit function of identifying a location through an image that photographed the surrounding environment through a camera provided on the first electronic apparatus 200-1 (e.g.: a location identification function), and a third unit function of absorbing dust, etc. through an absorption motor provided on the first electronic apparatus 200-1 (referred to as an absorption function).

Meanwhile, the implementation example illustrated in FIG. 1 is merely an embodiment, and each of the plurality of electronic apparatuses 100, 200-1, 200-2 may be implemented as at least one of a smartphone, a tablet, a computer, a smart TV, a smart speaker, an artificial intelligence speaker, an air conditioning device, a refrigerator, a digital video disk (DVD) player, an audio, a robot cleaner, a cleaner, an oven, a microwave oven, a washing machine, an air purifier, a set-top box, a home automation control panel, a security control panel, a TV box (e.g.: Samsung HomeSync, Apple TV, or Google TV), a game console (e.g.: Xbox, PlayStation), a medical device, a vehicle, an electronic dictionary, a camcorder, an electronic picture frame, a point of sales (POS) of a store, various Internet of Things devices (e.g.: a light bulb, a lighting, various kinds of sensors, an electronic or gas meter, a sprinkler device, a fire alarm, a thermostat, a street light, a toaster, exercise equipment, a hot water tank, a heater, a boiler, etc.), or a wearable device. Also, the number of the plurality of electronic apparatuses 100, 200-1, 200-2 may be changed in various ways.

Meanwhile, in the aforementioned description, it was described that the electronic apparatus 100 is an electronic apparatus that performs an interaction with a user, and the other electronic apparatuses 200-1, 200-2 are electronic apparatuses that perform a service, but the electronic apparatus 100 may perform a service and/or the other electronic apparatuses 200-1, 200-2 may perform an interaction with a user. That is, the electronic apparatus 100 according to an embodiment of the disclosure may be any one apparatus that performs the operation that will be described below among the plurality of electronic apparatuses 100, 200-1, 200-2 connected via a network.

Hereinafter, the electronic apparatus 100 of the disclosure will be described in detail with reference to the accompanying drawings.

Figure 2:
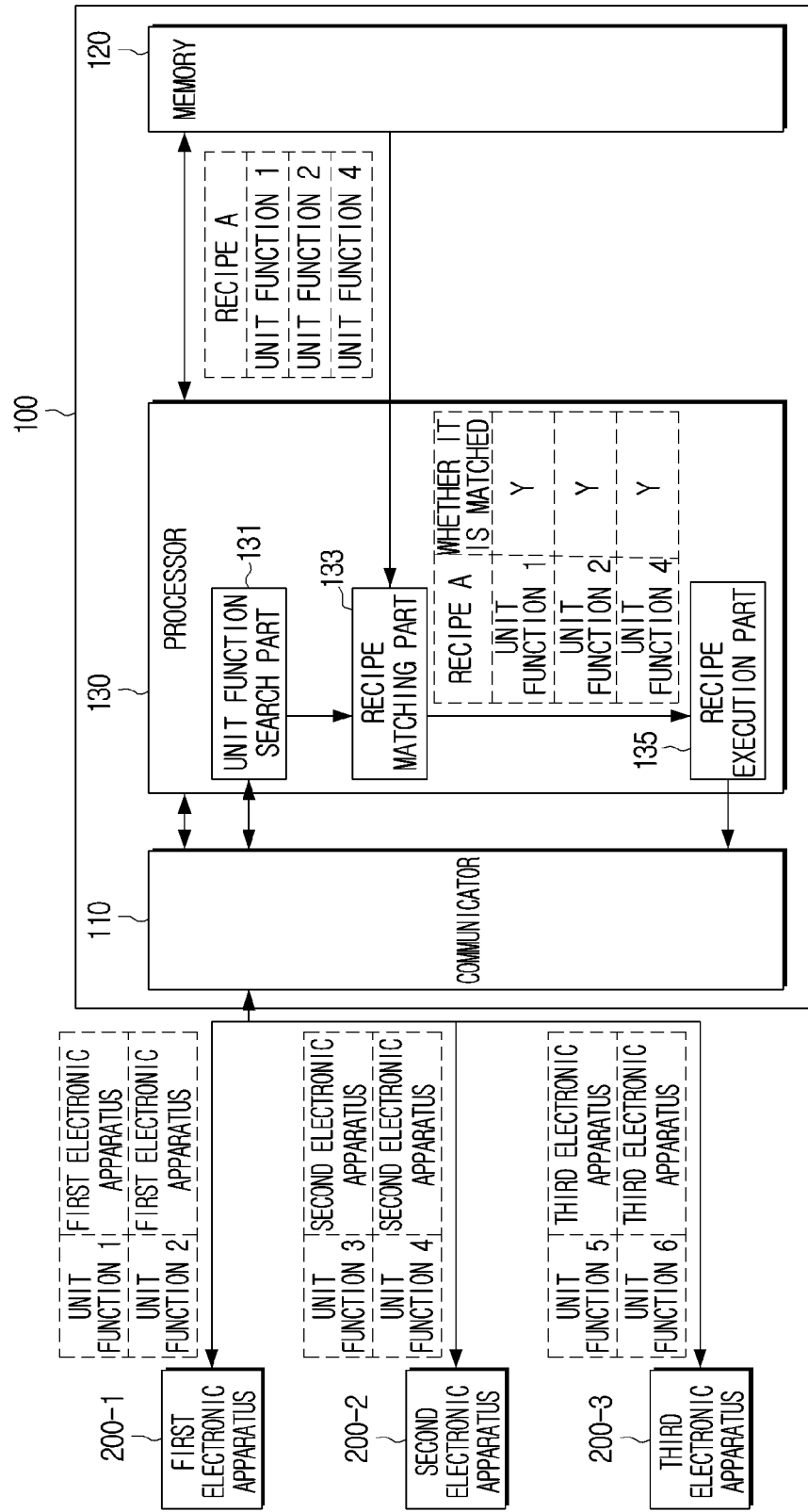
FIG. 2 is a block diagram for illustrating a configuration of an electronic apparatus according to an embodiment of the disclosure.
Figure 3:
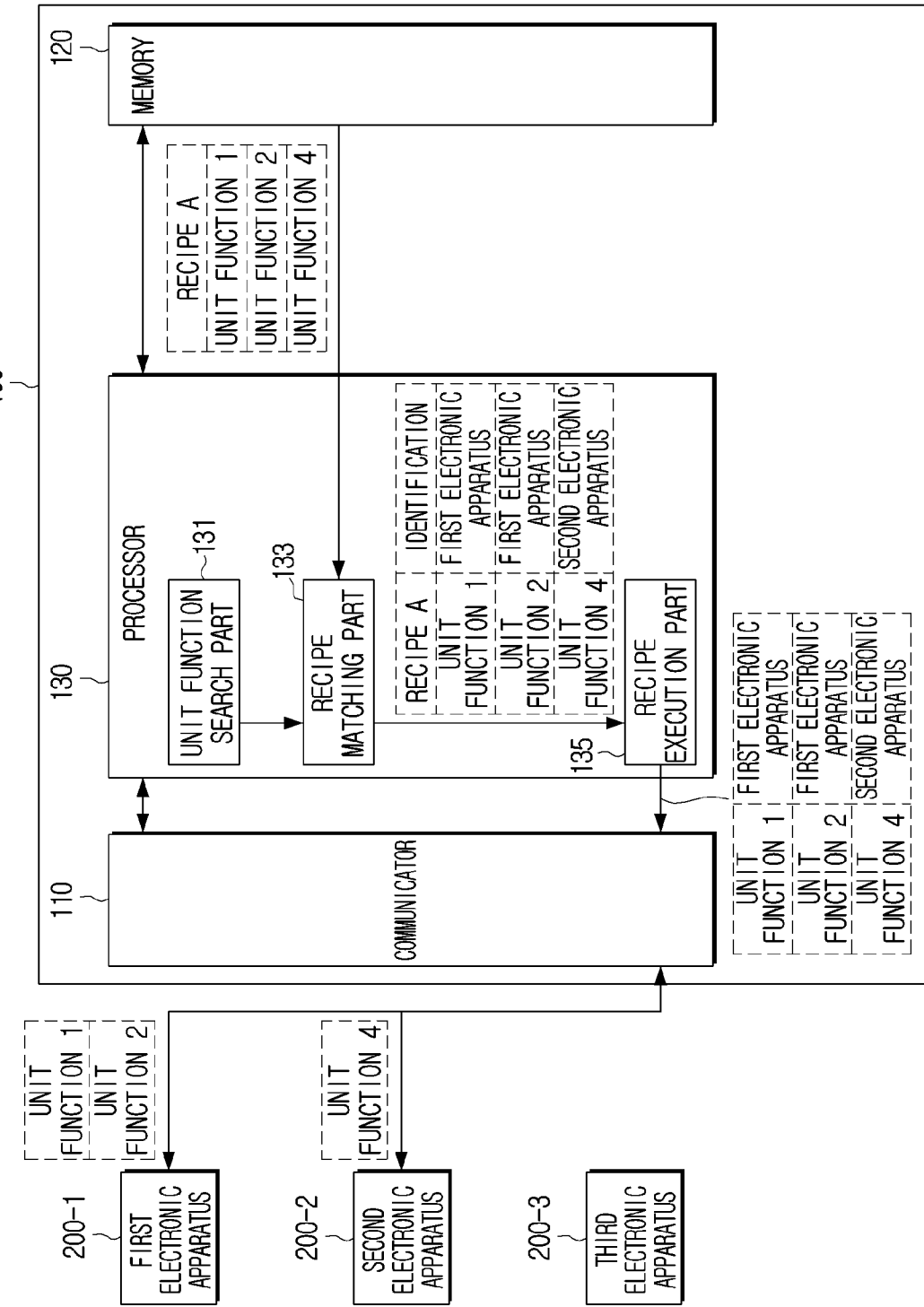
FIG. 3 is a block diagram for illustrating a configuration of an electronic apparatus according to an embodiment of the disclosure.

FIG. 2 and FIG. 3 are block diagrams for illustrating a configuration of an electronic apparatus according to an embodiment of the disclosure.

Referring to FIG. 2 and FIG. 3, the electronic apparatus 100 according to an embodiment of the disclosure may include a communicator 110, a memory 120, and a processor 130.

The communicator 110 may refer to a component that performs wired communication or wireless communication with the other electronic apparatuses 200-1 to 200-3, and transmit or receive various information (or data).

The memory 120 may refer to a component wherein various information (or data) can be stored. The memory 120 may store information in an electronic form or magnetic form.

Specifically, in the memory 120, at least one instruction, a module, or data necessary for an operation of the electronic apparatus 100 or the processor 130 may be stored. Here, an instruction is a unit that instructs an operation of the electronic apparatus 100 or the processor 130, and it may have been drafted in a machine language that the electronic apparatus 100 or the processor 130 can understand. A module may be a set of instructions of subordinate units constituting a software program (or an operation system, an application, a dynamic library, a runtime library, etc.), but this is merely an embodiment, and a module may be a program itself. Data may be a material in units of bits or bytes, etc. that the electronic apparatus 100 or the processor 130 can process for indicating information such as texts, numbers, voices, images, etc.

Based on information regarding a unit function that can be performed at each electronic apparatus 200-1 to 200-3 being received from each of the plurality of electronic apparatuses 200-1 to 200-3 through the communicator 110, the processor 130 may identify whether a plurality of unit functions matched with a plurality of unit functions included in a recipe exist based on the received information. Here, matching may indicate that values for two data are in an identical relation or a corresponding relation (e.g.: a relation wherein the data are data of the same row, or data of the same column).

Then, if it is identified that a plurality of matched unit functions exist, the processor 130 may identify the plurality of electronic apparatuses 200-1 to 200-2 that can perform the plurality of matched unit functions among the plurality of electronic apparatuses 200-1 to 200-3.

Then, the processor 130 may control the communicator 110 to transmit a signal for performing each unit function matched to each of the plurality of identified electronic apparatuses 200-1 to 200-2.

According to an embodiment of the disclosure, referring to FIG. 2 and FIG. 3, the processor 130 may perform an operation corresponding to each instruction by executing instructions included in each of a unit function search part 131, a recipe matching part 133, and a recipe execution part 135. Here, the unit function search part 131, the recipe matching part 133, and the recipe execution part 135 may be stored in the memory 120 or the processor 130.

Specifically, through the unit function search part 131, the processor 130 may control the communicator 110 to transmit a signal (a request signal) requesting information for a unit function that can be performed at each electronic apparatus 200-1 to 200-3 to each of the plurality of electronic apparatuses 200-1 to 200-3 connected with the electronic apparatus 100 via a network. For example, through the unit function search part 131, the processor 130 may control the communicator 110 to transmit a signal requesting information for a unit function that can be performed at the first electronic apparatus 200-1 to the first electronic apparatus 200-1 connected with the electronic apparatus 100 via a network. Also, through the unit function search part 131, the processor 130 may control the communicator 110 to transmit a signal requesting information for a unit function that can be performed at the second electronic apparatus 200-2 to the second electronic apparatus 200-2 connected with the electronic apparatus 100 via a network. The aforementioned operation of the processor 130 can also be applied to the third electronic apparatus 200-3.

For this, the electronic apparatus 100 may be connected with the plurality of electronic apparatuses 200-1 to 200-3 via a network through various communication methods (e.g.: Wi-Fi, Bluetooth, LAN, etc.).

Here, each electronic apparatus 200-1 to 200-3 connected with the electronic apparatus 100 via a network may perform at least one unit function. Here, a unit function that can be performed at the other electronic apparatuses 200-1 to 200-3 may refer to a function of a subordinate unit that is performed for providing a service according to the uses of the other electronic apparatuses 200-1 to 200-3. Hereinafter, for the convenience of explanation, a unit function that can be performed at the electronic apparatuses 200-1 to 200-3 will be simply referred to as a unit function of the electronic apparatuses 200-1 to 200-3.

For example, in case the first electronic apparatus 200-1 is a robot cleaner, a unit function may not be an automatic cleaning function that is performed for providing a cleaning service, but a function of a subordinate unit constituting an automatic cleaning function. That is, a unit function of a robot cleaner may be a moving function of moving the robot cleaner to another location, an absorption function of absorbing dust, etc., a photographing function of acquiring an image for the surrounding environment of the robot cleaner, a wireless charging function of charging the power (battery) by a wireless method such as a magnetic induction method, etc.

Also, a unit function of the other electronic apparatuses 200-1 to 200-3 according to an embodiment of the disclosure may be a function that is implemented to be able to receive a request from another electronic apparatus among the electronic apparatus 100 and the other electronic apparatuses 200-1 to 200-3 connected to a network, and perform the request and respond, among the functions of subordinate units combined for provision of a service according to the uses of the other electronic apparatuses 200-1 to 200-3.

For example, in case the first electronic apparatus 200-1 is a robot cleaner, among the dust absorption function, the wireless charging function, the photographing function, and the moving function that can be performed for a service according to the intrinsic use of the robot cleaner (an automatic cleaning service), only the photographing function and the moving function of receiving a request from another electronic apparatus 100 connected to a network and performing the request and responding may be unit functions.

Meanwhile, a unit function of the other electronic apparatuses 200-1 to 200-3 may be performed by using hardware provided in the other electronic apparatuses 200-1 to 200-3. Accordingly, a unit function of the other electronic apparatuses 200-1 to 200-3 may be determined according to at least one of the type of hardware or the performance of hardware provided in the other electronic apparatuses 200-1 to 200-3.

For example, in case the first electronic apparatus 200-1 includes a camera, a unit function of the first electronic apparatus 200-1 may include a photographing function of acquiring an image for the surrounding environment. As another example, in case the second electronic apparatus 200-2 includes a moving means (e.g.: wheels, wings, a motor, etc.), a unit function of the second electronic apparatus 200-2 may include a moving function of moving the second electronic apparatus 200-2 to another location. As described above, in case at least one of the type of hardware or the performance of hardware provided in each of the other electronic apparatuses 200-1 to 200-3 is different, unit functions of each of the electronic apparatuses 200-1 to 200-3 may be different from one another.

In this case, the communicator 110 may transmit a signal (a request signal) requesting information on a unit function that can be performed at each electronic apparatus 200-1 to 200-3 to each of the plurality of electronic apparatuses 200-1 to 200-3. Then, each electronic apparatus 200-1 to 200-3 may transmit information on a unit function that can be performed at each electronic apparatus 200-1 to 200-3 to the electronic apparatus 100 as a response for the request signal received from the electronic apparatus 100.

In this case, the communicator 110 may receive the information on a unit function that can be performed at each electronic apparatus 200-1 to 200-3 from the plurality of electronic apparatuses 200-1 to 200-3. Here, the information on a unit function may include at least one of information for identifying the unit function (e.g.: the name of the unit function or the unique identifier, etc.), information on a network for accessing the unit function (e.g.: an Internet Protocol (IP) address, a Port, a MAC address, or a Uniform Resource Locator (URL), etc.), or information for identifying the electronic apparatuses 200-1 to 200-3 that can perform the unit function (e.g.: the names or the unique identifiers of the electronic apparatuses 200-1 to 200-3).

For example, the communicator 110 may receive information on a unit function that can be performed at the first electronic apparatus 200-1 (e.g.: information for identifying the first unit function, information for identifying the second unit function, and information indicating that the subject performing the first unit function and the second unit function is the first electronic apparatus 200-1) from the first electronic apparatus 200-1 that can perform the first unit function and the second unit function. Also, the communicator 110 may receive information on a unit function that can be performed at the second electronic apparatus 200-2 (e.g.: information for identifying the third unit function, information for identifying the fourth unit function, and information indicating that the subject performing the third unit function and the fourth unit function is the second electronic apparatus 200-2) from the second electronic apparatus 200-2 that can perform the third unit function and the fourth unit function. In addition, the aforementioned operation of the communicator 110 can be applied to the third electronic apparatus 200-3 that can perform the fifth unit function and the sixth unit function.

In this case, through the unit function search part 131, the processor 130 may transmit information on unit functions that can be performed at each electronic apparatus 200-1 to 200-3 received by the communicator 110 to the recipe matching part 133.

Then, through the recipe matching part 133, the processor 130 may identify a plurality of electronic apparatuses matched to a plurality of unit functions included in a recipe based on the received information. Here, an electronic apparatus matched to a unit function may refer to an electronic apparatus determined to perform the unit function in case the recipe is executed.

Specifically, through the recipe matching part 133, the processor 130 may identify whether a plurality of unit functions matched to the plurality of unit functions included in the recipe stored in the memory 120 exist, based on the information on unit functions received from each electronic apparatus 200-1 to 200-3.

For this, in the memory 120, at least one recipe may be stored. Here, each recipe refers to a recipe wherein a plurality of unit functions are combined for provision of a specific service, and each recipe may include information for identifying a plurality of unit functions. For example, in a recipe A, a plurality of unit functions such as a moving function, a photographing function, an image crop function, an object recognition function, and a display function may be combined for provision of a service that finds the location of an object (e.g.: a smartphone, a remote control, a book, a wallet, etc.) in a specific space and notifies the location to a user. However, this is merely an embodiment, and a recipe may include a plurality of unit functions combined in various ways according to a service to be provided. Hereinafter, for the convenience of explanation, it will be assumed that the recipe A includes the first unit function, the second unit function, and the third unit function as in FIG. 2 and FIG. 3.

For example, as in FIG. 2, the processor 130 may determine whether unit functions (e.g.: the first unit function to the sixth unit function) included in the information on unit functions received from each electronic apparatus 200-1 to 200-3 are matched to the unit functions (e.g.: the first unit function, the second unit function, and the fourth unit function) included in the recipe A stored in the memory 120. Here, the processor 130 may determine that the unit functions are matched in case the information on the unit functions of each electronic apparatus 200-1 to 200-3 and the information for identifying the unit functions in the recipe A stored in the memory 120 (e.g.: the names or the unique identifiers) are identical to each other.

As a more specific example, the processor 130 may determine whether the first unit function included in the recipe A is matched to one of the unit functions (e.g.: the first unit function to the sixth unit function) that can be performed at each electronic apparatus 200-1 to 200-3, determine whether the second unit function included in the recipe A is matched to one of the unit functions (e.g.: the first unit function to the sixth unit function) that can be performed at each electronic apparatus 200-1 to 200-3, and determine whether the fourth unit function included in the recipe A is matched to one of the unit functions (e.g.: the first unit function to the sixth unit function) that can be performed at each electronic apparatus 200-1 to 200-3.

Then, in case it is identified that a plurality of unit functions matched to the plurality of unit functions (e.g.: the first unit function, the second unit function, and the fourth unit function) included in the recipe A exist (i.e., in case it is a relation wherein the set of the plurality of unit functions included in the recipe A is included in the set of the plurality of unit functions that can be performed at the other electronic apparatuses 200-1 to 200-3) through the recipe matching part 133, the processor 130 may identify the plurality of electronic apparatuses matched to the plurality of unit functions included in the recipe A among the plurality of electronic apparatuses 200-1 to 200-3. That is, the processor 130 may identify each electronic apparatus matched to each unit function included in the recipe A among the plurality of electronic apparatuses 200-1 to 200-3.

For example, in the case of the first unit function matched to the recipe A, the processor 130 may search information for identifying the first unit function in the information on unit functions that can be performed at the other electronic apparatuses 200-1 to 200-3 (e.g.: information for identifying the first unit function mapped to each other and information for identifying the first electronic apparatus 200-1, information for identifying the second unit function mapped to each other and information for identifying the first electronic apparatus 200-1, information for identifying the third unit function mapped to each other and information for identifying the second electronic apparatus 200-2, information for identifying the fourth unit function mapped to each other and information for identifying the second electronic apparatus 200-2, information for identifying the fifth unit function mapped to each other and information for identifying the third electronic apparatus 200-3, and information for identifying the sixth unit function mapped to each other and information for identifying the third electronic apparatus 200-3), and identify the first electronic apparatus 200-1 matched to the searched first unit function as an electronic apparatus that can perform the first unit function. By such a method, the processor 130 may identify an electronic apparatus that can perform the second unit function matched to the recipe A as the first electronic apparatus 200-1, and identify an electronic apparatus that can perform the fourth unit function matched to the recipe A as the second electronic apparatus 200-2.

Hereinafter, for the convenience of explanation, it will be assumed that the first electronic apparatus 200-1 was identified as an electronic apparatus matched to the first unit function and the second unit function included in the recipe A, and the second electronic apparatus 200-2 was identified as an electronic apparatus matched to the fourth unit function included in the recipe A.

Then, referring to FIG. 3, in case the plurality of electronic apparatuses 200-1, 200-2 matched to the plurality of unit functions included in the recipe A were identified through the recipe matching part 133, the processor 130 may transmit information indicating that the recipe A can be executed to the recipe execution part 135. Here, the information indicating that the recipe A can be executed may include information wherein the plurality of unit functions included in the recipe A and the plurality of identified electronic apparatuses 200-1, 200-2 are matched to one another.

Then, if the information indicating that the recipe A can be executed is received, the processor 130 may control each of the plurality of identified electronic apparatuses 200-1, 200-2 to perform the plurality of unit functions included in the recipe A through the recipe execution part 135. In this case, the processor 130 may automatically execute the recipe A according to the received information, or execute the recipe A in case a user command was received.

Then, through the recipe execution part 135, the processor 130 may control the communicator 110 to transmit a signal for performing each unit function matched to each of the plurality of identified electronic apparatuses 200-1 to 200-2.

For example, in case the first electronic apparatus 200-1 was identified as an electronic apparatus matched to the first unit function and the second unit function included in the recipe A, and the second electronic apparatus 200-2 was identified as an electronic apparatus matched to the fourth unit function included in the recipe A, the processor 130 may control the communicator 110 to transmit a signal for performing the first unit function and the second unit function included in the recipe A to the first electronic apparatus 200-1, and control the communicator 110 to transmit a signal for performing the fourth unit function included in the recipe A to the second electronic apparatus 200-2 through the recipe execution part 135.

In this case, the processor 130 may automatically execute the recipe A according to the received information. As another example, the processor 130 may execute the recipe A in case a user command was received. For example, in case a user command for executing the recipe A was received, the processor 130 may control the communicator 110 to transmit a signal for performing each unit function (e.g.: the first unit function, the second unit function, and the fourth unit function) included in the recipe A to each of the plurality of identified electronic apparatuses 200-1, 200-2 through the recipe execution part 135.

In this case, the communicator 110 may transmit a signal for performing each matched unit function (e.g.: the first unit function, the second unit function, and the fourth unit function) to each of the plurality of identified electronic apparatuses 200-1, 200-2. Then, based on the signal transmitted from the communicator 110 being received, the plurality of electronic apparatuses 200-1, 200-2 may perform each unit function (e.g.: the first unit function, the second unit function, and the fourth unit function).

As described above, the electronic apparatus 100 according to an embodiment of the disclosure can provide a service through combined unit functions by performing a unit function at each of the other electronic apparatuses 200-1 to 200-3.

Also, according to an embodiment of the disclosure, an environment wherein a new service is provided to a user as a function provided at a conventional single electronic apparatus is performed while being combined with a function that can be performed at another electronic apparatus can be constructed. For example, purchasing a recipe providing a new service through a combination of unit functions at a store (or a server, etc.) and downloading it can be activated, and as another example, purchase and sales of electronic apparatuses modularized in units of unit functions can increase.

In addition, according to an embodiment of the disclosure, even in case a specific unit function among a plurality of unit functions required for providing a specific service in a network environment of a user is lacked, the specific service can be provided as another electronic apparatus performs the lacked unit function.

In this case, without replacing the electronic apparatus with a new electronic apparatus that can perform all of the plurality of unit functions, another conventional electronic apparatus that can perform the lacked unit function can be used, or a new electronic apparatus that can perform the lacked unit function can be added, and accordingly, there is an effect of saving the cost and resources required for provision of the service.

Figure 4:
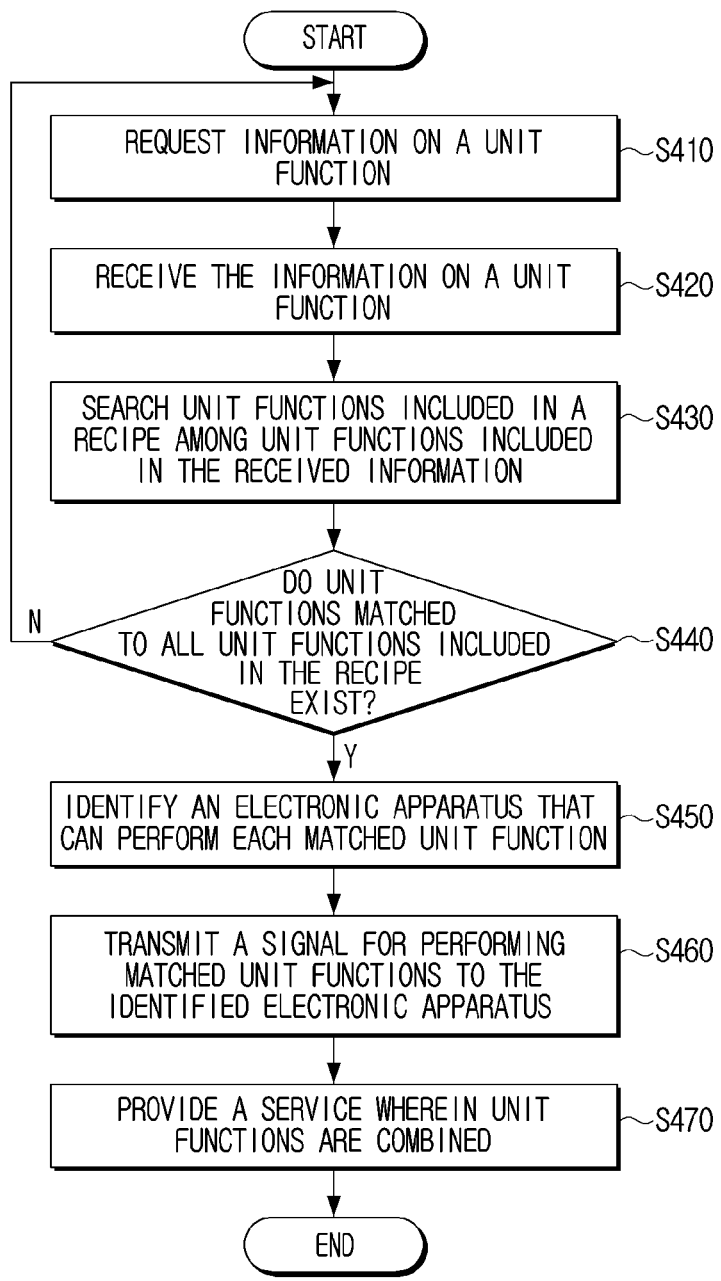
FIG. 4 is a diagram for illustrating an operation of an electronic apparatus according to an embodiment of the disclosure.

FIG. 4 is a diagram for illustrating an operation of an electronic apparatus according to an embodiment of the disclosure.

Referring to FIG. 4, the electronic apparatus 100 may transmit a signal requesting information on unit functions to the plurality of electronic apparatuses 200-1 to 200-3 in operation S410. Specifically, the processor 130 of the electronic apparatus 100 may control the communicator 110 to transmit a signal requesting information on a unit function that can be performed at each electronic apparatus 200-1 to 200-3 to each of the plurality of electronic apparatuses 200-1 to 200-3 connected with the electronic apparatus 100 via a network. Here, the transmission may be implemented by using a service discovery protocol (e.g.: Domain Name System Service Discovery (DNS-SD), Multicast DNS (mDNS), Universal Plug and Play (UPnP), etc.).

For this, network connection between the electronic apparatus 100 and the plurality of electronic apparatuses 200-1 to 200-3 may be constructed through various communication methods. For example, the processor 130 may control the communicator 110 to transmit a probe signal for searching other electronic apparatuses to a plurality of unspecified electronic apparatuses by a method such as broadcasting. In this case, a plurality of electronic apparatuses located within a specific distance (or a cell) based on the location of the electronic apparatus 100 may receive the probe signal. Here, the plurality of electronic apparatuses that receive the probe signal will be assumed as the first electronic apparatus 200-1, the second electronic apparatus 200-2, and the third electronic apparatus 200-3 for the convenience of explanation. Then, the plurality of electronic apparatuses 200-1 to 200-3 may transmit a response signal for the received probe signal to the electronic apparatus 100. Here, the response signal may include information on each of the plurality of electronic apparatuses 200-1 to 200-3 for connecting each of the plurality of electronic apparatuses 200-1 to 200-3 with the electronic apparatus 100 via a network. Then, based on the response signal being received through the communicator 110, the processor 130 may generate a profile for each of the plurality of electronic apparatuses 200-1 to 200-3 based on the response signal. In this case, the profile may include the name and the network address of each electronic apparatus 200-1 to 200-3. As described above, the electronic apparatus 100 may construct network connection with the plurality of electronic apparatuses 200-1 to 200-3, and transmit and receive data with the plurality of electronic apparatuses 200-1 to 200-3 connected via a network. Meanwhile, this is merely an embodiment, and it is possible to construct network connection through various modified embodiments.

Then, based on a signal requesting information on a unit function being received from the electronic apparatus 100, each of the plurality of electronic apparatuses 200-1 to 200-3 may generate information on a unit function as a response to the requesting signal, and transmit the generated information on a unit function to the electronic apparatus 100. Alternatively, based on a signal requesting information on a unit function being received from the electronic apparatus 100, each of the plurality of electronic apparatuses 200-1 to 200-3 may transmit information on a unit function prestored in each of the plurality of electronic apparatuses 200-1 to 200-3 to the electronic apparatus 100 as a response to the requesting signal. For example, each of the plurality of electronic apparatuses 200-1 to 200-3 may broadcast a network address for a unit function of each electronic apparatus 200-1 to 200-3 (e.g.: an IP, a Port, etc.) by various methods such as DNS-SD, etc. so that other electronic apparatuses of the network can search the unit function of each electronic apparatus 200-1 to 200-3.

Here, information on a unit function may include, for example, an identifier for each electronic apparatus 200-1 to 200-3 and an identifier for a unit function. Also, information on a unit function may have various data structures such as a lookup table, etc., and in the information on a unit function, an identifier for each electronic apparatus 200-1 to 200-3 and an identifier for a unit function may be matched in a corresponding relation. For example, in case information on a unit function has a data structure of a lookup table, for indicating the first unit function that can be performed at the first electronic apparatus 200-1, the identifier for the first electronic apparatus 200-1 and the identifier for the first unit function may be arranged in the same column (or row).

Also, a unit function may vary according to the type of hardware or the performance of hardware provided in each electronic apparatus 200-1 to 200-3. Here, hardware is a physical component that performs a specific operation (or acquires specific data), and the type of hardware may refer to items (or categories) classifying various hardware such as a camera, a moving device, a sensor, a processor, a display, a speaker, etc. according to an operation performed at the hardware.

In this case, the electronic apparatus 100 may receive information on a unit function that can be performed at each electronic apparatus 200-1 to 200-3 from each of the plurality of electronic apparatuses 200-1 to 200-3 through the communicator 110 in operation S420. As described above, the electronic apparatus 100 may collect information on unit functions from the plurality of electronic apparatuses 200-1 to 200-3 connected via a network.

Then, the processor 130 may identify whether unit functions matched to each of a plurality of unit functions included in a recipe in an identical relation exist among the plurality of unit functions included in the received information in operation S430. Specifically, the processor 130 may search matched unit functions with the identifier for each unit function included in the recipe as a search word (a keyword) among the plurality of unit functions included in the received information, and thereby identify whether matched unit functions exist. Such an operation may be repeatedly performed by the same number as the number of unit functions included in the recipe.

Meanwhile, as an example, information on a recipe may be received from a server through the communicator 110 and stored in the memory 120. Here, the server may be a server that provides a recipe wherein a plurality of unit functions are combined at a cost (or for free). For example, in case a user purchased a specific recipe at a cost (e.g.: in case purchase information indicating that payment for a specific recipe was completed was received), the server may transmit the information on the recipe to the electronic apparatus 100 of the user.

As an example, in case a plurality of unit functions matched to a plurality of unit functions included in a recipe exist among the plurality of unit functions included in the received information in operation S440, Y, the processor 130 may identify other electronic apparatuses matched to each unit function included in the recipe among the plurality of electronic apparatuses 200-1 to 200-3 in operation S450. Here, an electronic apparatus matched to a unit function may refer to an electronic apparatus determined to perform the unit function in case the recipe is executed.

Specifically, in case a plurality of unit functions matched to a plurality of unit functions included in a recipe exist among the plurality of unit functions included in the received information, the processor 130 may search unit functions matched to the recipe in the information received in the operation S420. Then, the processor 130 may identify electronic apparatuses matched to the unit functions searched in the received information in a corresponding relation as the other electronic apparatuses 200-1 to 200-3 that can perform the unit functions. In this case, being matched in a corresponding relation in the received information may refer to, for example, two data (an identifier for a unit function and an identifier for an electronic apparatus) being arranged in different columns in the same row or being arranged in different rows in the same column in the structure of a lookup table.

Meanwhile, the aforementioned embodiment is merely an example, and the disclosure can also be modified into various embodiments. For example, the operation S440 may be omitted, and the processor 130 may search each unit function included in the recipe in the received information, and identify electronic apparatuses in a corresponding relation with the unit functions searched in the received information as other electronic apparatuses that can perform the searched unit functions. In this case, the processor 130 may identify other electronic apparatuses that can perform each unit function included in the recipe by repeatedly performing the aforementioned operation in the same number as the number of the unit functions included in the recipe.

Then, the processor 130 may control the communicator 110 to transmit a signal for performing each matched unit function to each of the plurality of identified electronic apparatuses (e.g.: 200-1, 200-2) in operation S460.

Specifically, in case the plurality of electronic apparatuses (e.g.: 200-1, 200-2) were identified, the processor 130 may control the communicator 110 to transmit a signal for performing the first unit function among the plurality of unit functions to the first electronic apparatus 200-1 that can perform the first unit function among the plurality of identified electronic apparatuses (e.g.: 200-1, 200-2).

The processor 130 according to an embodiment of the disclosure may control the communicator 110 to transmit a signal for performing the second unit function among the plurality of unit functions to the second electronic apparatus 200-2 that can perform the second unit function among the plurality of identified electronic apparatuses (e.g.: 200-1, 200-2) based on data acquired by performing the first unit function. Here, the data acquired by performing the first unit function may generally refer to data acquired by performing one unit function or a plurality of unit functions. The data acquired by performing the first unit function may be used in performing the second unit function.

As a specific example, based on data acquired from the first electronic apparatus 200-1 being received through the communicator 110, the processor 130 may control the communicator 110 to transmit the received data to the second electronic apparatus 200-2. Accordingly, the data acquired from the first electronic apparatus 200-1 may be transmitted from the first electronic apparatus 200-1 to the second electronic apparatus 200-2 via the electronic apparatus 100.

As another specific example, the processor 130 may control the communicator 110 to transmit a signal controlling to transmit data acquired from the first electronic apparatus 200-1 to the second electronic apparatus 200-2 to the first electronic apparatus 200-1. Accordingly, the data acquired from the first electronic apparatus 200-1 may be transmitted from the first electronic apparatus 200-1 to the second electronic apparatus 200-2 without going through the electronic apparatus 100.

Then, each of the plurality of electronic apparatuses 200-1 to 200-3 may provide a service according to the recipe wherein unit functions are combined by performing a unit function according to a signal for performing a unit function received from the electronic apparatus 100 in operation S470.

Meanwhile, as an example different from the aforementioned example, in case at least one unit function is not matched to the plurality of unit functions included in the recipe among the plurality of unit functions included in the received information in operation S440, Y, the processor 130 may determine that provision of a service according to the recipe is impossible. Here, the processor 130 may control the display 140 (refer to FIG. 8 and FIG. 15) to display a guidance message indicating that provision of a service according to the recipe is impossible. Also, the processor 130 may control the display 140 to display information on unit functions that are not matched among the plurality of unit functions included in the recipe.

Figure 5:
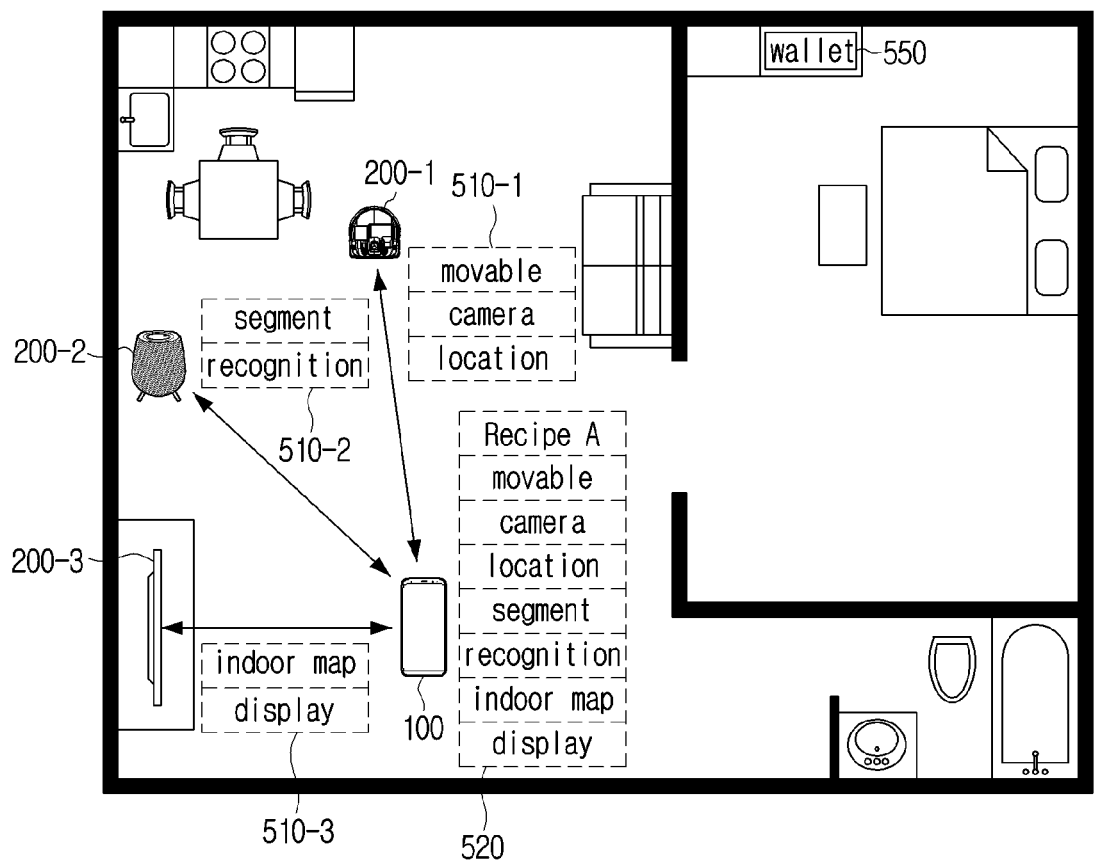
FIG. 5 is a diagram for illustrating a method of matching a unit function according to an embodiment of the disclosure.

FIG. 5 is a diagram for illustrating a method of matching a unit function according to an embodiment of the disclosure.

Referring to FIG. 5, the electronic apparatus 100 is connected with the first electronic apparatus 200-1, the second electronic apparatus 200-2, and the third electronic apparatus 200-3 via a network. Here, explanation will be made based on the assumption that the electronic apparatus 100 is a smartphone, the first electronic apparatus 200-1 is a robot cleaner, the second electronic apparatus 200-2 is a smart speaker, and the third electronic apparatus 200-3 is a TV.

First, the electronic apparatus 100 may transmit a signal requesting information on unit functions to the first to third electronic apparatuses 200-1 to 200-3 connected via a network. The network in FIG. 5 illustrated in the disclosure illustrates a network constructed within a household environment of a user, but this is merely an embodiment, and various modified embodiments are possible.

In response to this, the electronic apparatus 100 may receive information on unit functions 510-1 to 510-3 from each of the first to third electronic apparatuses 200-1 to 200-3. For example, the electronic apparatus 100 may receive information 510-1 on unit functions that can be performed at the first electronic apparatus 200-1 (e.g.: a moving function, a camera function, and a location identification function) from the first electronic apparatus 200-1, receive information 510-2 on unit functions that can be performed at the second electronic apparatus 200-2 (e.g.: an image crop function, an object identification function) from the second electronic apparatus 200-2, and receive information 510-3 on unit functions that can be performed at the third electronic apparatus 200-3 (e.g.: an indoor map function, a display function) from the third electronic apparatus 200-3.

The electronic apparatus 100 may store information on the recipe A 520 in advance. In the information on the recipe A 520, a plurality of unit functions may be stored. Also, the information on the recipe A 520 may include information on a prior-posterior relation or a parallel relation. A prior-posterior relation may indicate that a plurality of unit functions are performed sequentially, and a parallel relation may indicate that a plurality of unit functions are performed simultaneously or in parallel. In this case, a combination of a prior-posterior relation and a parallel relation is also possible.

Hereinafter, the recipe A will be assumed as a recipe providing a service of finding an object. Here, an object may be set or changed according to a user's command, and for the convenience of explanation, it will be assumed that the object is set as a wallet 550 of a user.

For example, as in FIG. 5, information on the recipe A 520 may include the first unit function (e.g.: a moving function), the second unit function (e.g.: a camera function), the third unit function (e.g.: a location identification function), the fourth unit function (e.g.: an image crop function), the fifth unit function (e.g.: an object recognition function), the sixth unit function (e.g.: an indoor map function), and the seventh unit function (e.g.: a display function). In this case, the information on the recipe A 520 may also include information on a prior-posterior relation wherein the first to seventh unit functions are performed sequentially.

Based on information on unit functions 510-1 to 510-3 being received from each of the first to third electronic apparatuses 200-1 to 200-3, the electronic apparatus 100 may identify whether unit functions matched to the unit functions included in the information on the recipe A 520 exist among the unit functions included in the information on unit functions 510-1 to 510-3.

For example, the electronic apparatus 100 may search the first unit function (e.g.: a moving function) among the plurality of unit functions (e.g.: a moving function, a camera function, . . . , etc.) included in the information on the recipe A 520 among the plurality of unit functions (e.g.: a moving function, a camera function, . . . , etc.) included in the received information on unit functions 510-1 to 510-3, and identify that a unit function matched in an identical relation to each other (e.g.: a moving function) exists. The electronic apparatus 100 may also repeatedly perform such an operation for other unit functions included in the information on the recipe A 520.

Meanwhile, according to an embodiment of the disclosure, there may be a case wherein one unit function is associated with another unit function and performed in one electronic apparatus for provision of a specific service. Detailed explanation in this regard will be made with reference to FIG. 6.

Figure 6:
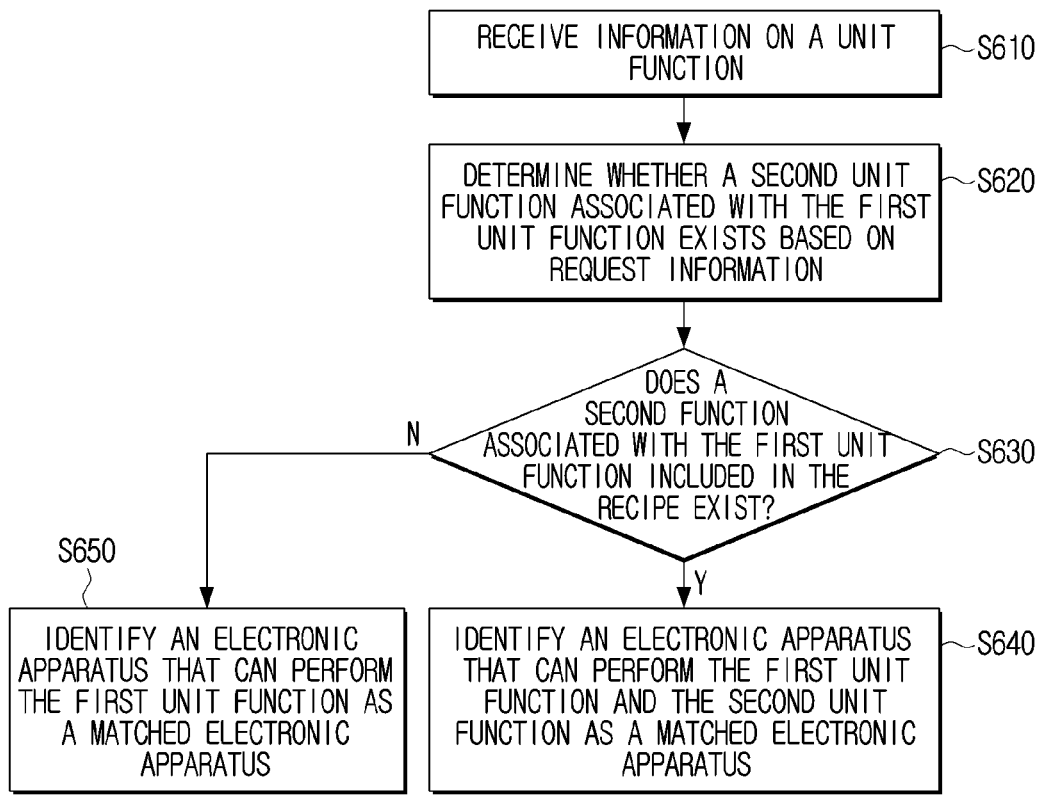
FIG. 6 is a diagram for illustrating a method of matching a unit function according to an embodiment of the disclosure.

FIG. 6 is a diagram for illustrating a method of matching a unit function according to an embodiment of the disclosure. Hereinafter, for omitting repeated contents, only the first unit function among the plurality of unit functions included in the recipe will be explained, and contents overlapping with the aforementioned contents in FIG. 1 to FIG. 5 will be explained briefly.

Referring to FIG. 6, the processor 130 may receive information on a unit function from each of the plurality of electronic apparatuses 200-1 to 200-3 through the communicator 110 in operation S610.

Then, the processor 130 may identify electronic apparatuses matched to the plurality of unit functions included in the recipe based on the received information.

As a specific embodiment, the processor 130 may identify whether other unit functions performed in association with a unit function exist for each of the plurality of unit functions included in the recipe based on request information in operation S620. Here, the memory 120 may further store request information indicating other unit functions performed in association with at least one function for provision of a service among the plurality of unit functions included in the recipe.

Here, the request information may indicate other unit functions performed in association with at least one function for provision of a service among the plurality of unit functions included in the recipe. For example, the request information may include information on a different second unit function which is required to be performed in association with the first unit function included in the recipe.

Request information according to an embodiment may be included in the recipe. That is, the recipe may further include request information. For example, request information may be arranged in a location within the recipe corresponding to the identifier for the first unit function included in the recipe (e.g.: a different column in the same row, a different row in the same column, etc.). However, this is merely an embodiment, and request information may exist as information independent from information on the recipe.

As an example, in case a different second unit function performed in association with the first unit function included in the recipe exists in operation S630, Y, the processor 130 may identify an electronic apparatus that can perform the first unit function and the second unit function as the electronic apparatus matched to the first unit function and the second unit function among the plurality of unit functions included in information received from one electronic apparatus (e.g.: 200-1) among the plurality of electronic apparatuses 200-1 to 200-3 in operation S640.

Meanwhile, as another example, in case a different second unit function performed in association with the first unit function included in the recipe does not exist in operation S630, N, the processor 130 may identify an electronic apparatus that can perform the first unit function as the electronic apparatus matched to the first electronic apparatus in operation S650.

Meanwhile, according to an embodiment of the disclosure, there may be a case wherein a plurality of electronic apparatuses that can perform one unit function included in the recipe exist, and in this case, which electronic apparatus is to be controlled to perform the unit function may become a problem. Detailed explanation in this regard will be made with reference to FIG. 7.

Figure 7:
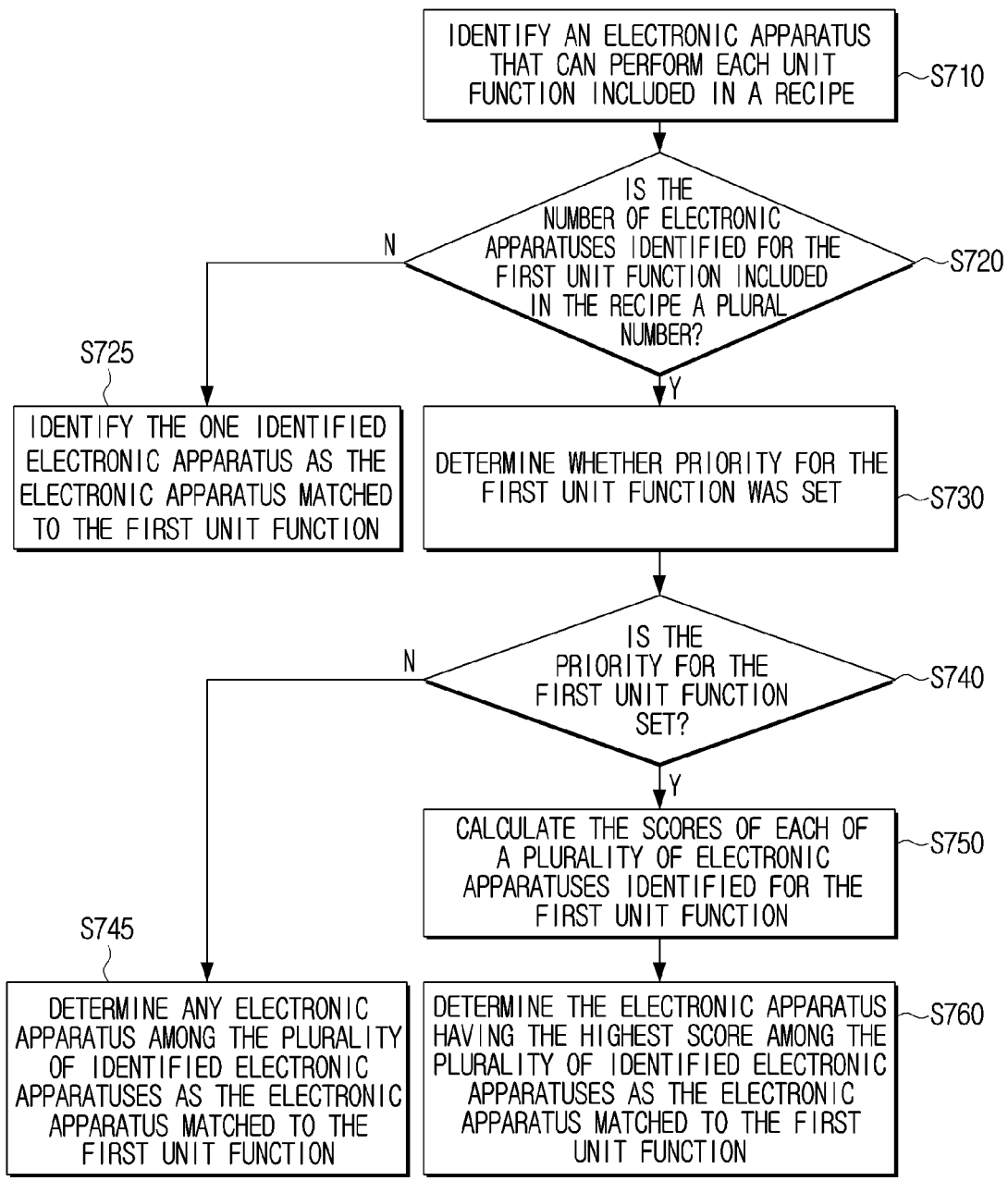
FIG. 7 is a diagram for illustrating a method of identifying an electronic apparatus according to an embodiment of the disclosure.

FIG. 7 is a diagram for illustrating a method of identifying an electronic apparatus according to an embodiment of the disclosure. Hereinafter, for omitting repeated contents, only the first unit function among the plurality of unit functions included in the recipe will be explained, and contents overlapping with the aforementioned contents in FIG. 1 to FIG. 6 will be explained briefly.

In case a plurality of electronic apparatuses that can perform at least one unit function among the plurality of unit functions included in the recipe are identified, the processor 130 may identify one electronic apparatus among the plurality of identified electronic apparatuses as the electronic apparatus matched to the at least one unit function based on the priority.

Specifically, referring to FIG. 7, the processor 130 may identify an electronic apparatus that can perform each unit function included in the recipe based on the received information on unit functions in operation S710.

In this case, the received information on unit functions may further include performance information on at least one unit function. For example, performance information on a display function may include resolutions that can be displayed (e.g.: Full-HD(1920*1080), Quad-HD(2560*1440), 4K(3840*2160 or 4096*2160), 8K(7680*4320), etc.), screen refresh rate (e.g.: 60 Hz, 120 Hz, 144 Hz, etc.), and the like. As another example, performance information on an object recognition function may include a speed of processing an image frame (frame per second; fps), etc., and performance information on a camera function may include resolutions, a speed of acquiring an image frame (fps), a focal distance, etc.

Also, in case an electronic apparatus that can perform the first unit function among the plurality of unit functions included in the recipe is identified as one electronic apparatus (e.g.: an electronic apparatus A) in operation S720, N, the processor 130 may determine the identified electronic apparatus (e.g.: an electronic apparatus A) as the electronic apparatus matched to the first unit function in operation S725. Here, the electronic apparatus matched to the first unit function may refer to an electronic apparatus determined to perform the first unit function in case the recipe is executed.

Unlike the above, in case an electronic apparatus that can perform the first unit function among the plurality of unit functions included in the recipe is identified as a plurality of electronic apparatuses (e.g.: an electronic apparatus A, an electronic apparatus B) in operation S720, Y, the processor 130 may determine whether the priority for the first unit function was set based on priority information in operation S730. Hereinafter, explanation will be made based on the assumption that the plurality of electronic apparatuses are the electronic apparatus A and the electronic apparatus B for the convenience of explanation.

Here, the priority information may refer to the priority set for each of at least one function among the plurality of unit functions included in the recipe. Here, the priority may refer to the priority for the performance of a unit function. Meanwhile, the priority information may be included in the recipe. That is, the recipe may further include the priority information. However, this is merely an embodiment, and the priority information may exist as separate independent information from the recipe.

As an example, in case priority set for the first unit function (e.g.: a display function) exists in operation S740, Y, the processor 130 may calculate the scores of each of the identified electronic apparatus A and electronic apparatus B for the first unit function based on the performance information (e.g.: resolutions) received from the identified electronic apparatus A and electronic apparatus B in operation S750. Here, the scores of the first unit function may indicate values that quantified the performance of the first unit function performed in each of the electronic apparatus A and the electronic apparatus B or the degrees of excellence of performance, and they may be calculated through various algorithms.

As an example, the processor 130 may identify the electronic apparatus having the highest (or the biggest) calculated score between the identified electronic apparatus A and electronic apparatus B (i.e., the electronic apparatus having the biggest score) as the electronic apparatus matched to the first unit function (e.g.: the electronic apparatus A) in operation S760. Here, as a score for a unit function is higher (or bigger), it may indicate that performance for the unit function is fast or good. However, this is merely an embodiment, and a score can be implemented with various quantitative indices, and accordingly, as a score is lower (or smaller), it may indicate that performance for a unit function is good.

As an example different from the above, in case priority set for the first unit function does not exist in operation S740, N, the processor 130 may identify any electronic apparatus (e.g.: the electronic apparatus A) among the plurality of identified electronic apparatuses (e.g.: the electronic apparatus A, the electronic apparatus B) as the electronic apparatus matched to the first unit function (e.g.: the electronic apparatus A) in operation S745.

For example, the processor 130 may calculate the value of a random function (e.g.: a value between 0 and 1) for each of the plurality of identified electronic apparatuses (e.g.: the electronic apparatus A, the electronic apparatus B), and identify the electronic apparatus having the highest value among the calculated values as the electronic apparatus matched to the first unit function.

Figure 8:
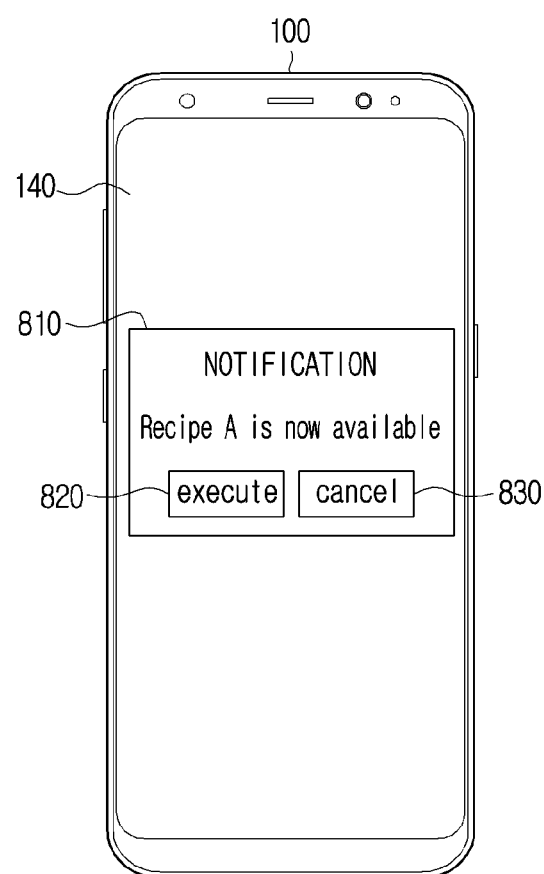
FIG. 8 is a diagram for illustrating a UI in case a recipe can be performed according to an embodiment of the disclosure.
Figure 15:
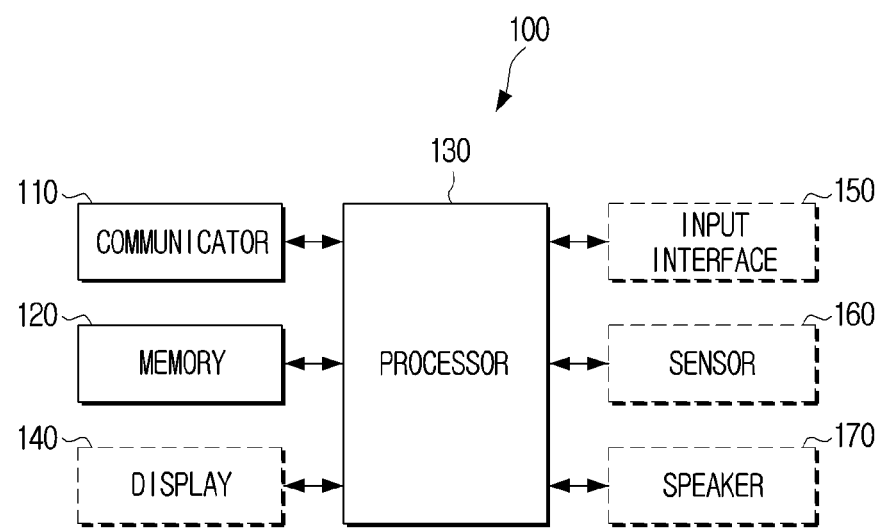
FIG. 15 is a block diagram for illustrating additional components of an electronic apparatus according to an embodiment of the disclosure.

Meanwhile, the electronic apparatus 100 according to an embodiment of the disclosure may further include a display 140 (refer to FIG. 8 and FIG. 15). Detailed explanation in this regard will be made with reference to FIG. 8.

FIG. 8 is a diagram for illustrating a UI in case a recipe can be performed according to an embodiment of the disclosure.

Referring to FIG. 8, if it is identified that a plurality of electronic apparatuses (e.g.: 200-1, 200-2) that can perform a plurality of unit functions included in a recipe exist, the processor 130 may control the display 140 to display a user interface (UI) 810 indicating that provision of a service corresponding to the recipe is possible.

Here, the UI 810 is for notifying to a user that provision of a service for the recipe is possible, and the UI 810 may be implemented as visual information in various forms such as texts, images, and moving images, etc. For example, the UI 810 may be implemented in various ways such as a message, an icon, a notification badge, an edge effect (displaying a corner area of the display in a specific color), highlight, etc. Also, the UI 810 may include at least one object. Here, for each object, a corresponding function may be set in advance. For example, for a first object, a function of executing the recipe A may be set, and for a second object, a function of executing the recipe B may be set, and for a third object, a function of not making any recipe executed may be set. In this case, in case one object is selected according to a user command, a specific function corresponding to the selected object may be performed.

For example, referring to FIG. 8, the UI 810 may be implemented in a message form, and the UI 810 may include a text notifying that provision of a service for the recipe A is possible. Also, the UI 810 may include an execution button 820 for executing the recipe A, and a cancel button 830 for removing the UI 810 so as not to be displayed on the display.

Then, based on a user command through the UI 810 being received, the processor 130 may control the communicator 110 to transmit a signal for performing each matched unit function to each of the plurality of identified electronic apparatuses (e.g.: 200-1, 200-2).

For example, referring to FIG. 8, a user command through the UI 810 may be a user command for selecting the execution button 820, and a form of a user command may be implemented in various ways such as a touch input, a user voice, a motion input, etc.

Referring to FIG. 5 again, it will be assumed that, based on the received information on unit functions 510-1 to 510-3 and the information on the recipe A 520 for provision of a service of finding the wallet 550, the processor 130 may identify an electronic apparatus that can perform the first to third unit functions as the first electronic apparatus 200-1, identify an electronic apparatus that can perform the fourth to fifth unit functions performed in the next order as the second electronic apparatus 200-2, and identify an electronic apparatus that can perform the sixth to seventh unit functions performed in the next order as the third electronic apparatus 200-3.

In this case, the processor 130 may control the communicator 110 to transmit a signal for performing the first to third unit functions to the first electronic apparatus 200-1, transmit a signal for performing the fourth to fifth unit functions to the second electronic apparatus 200-2, and transmit a signal for performing the sixth to seventh unit functions to the third electronic apparatus 200-3. Hereinafter, operations performed according to signals received at each electronic apparatus will be described with reference to FIG. 9 to FIG. 11.

Figure 9:
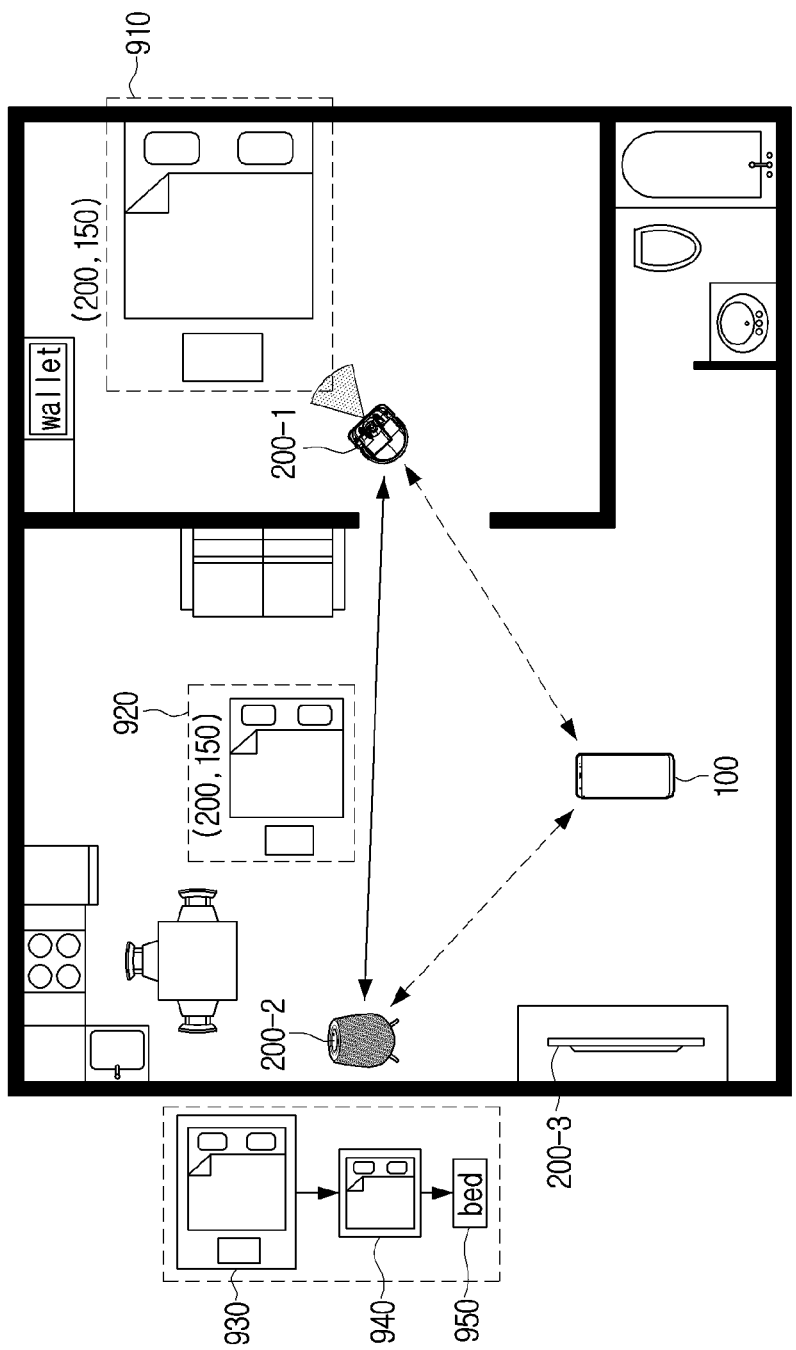
FIG. 9 is a diagram for illustrating performance of a recipe according to an embodiment of the disclosure.
Figure 10:
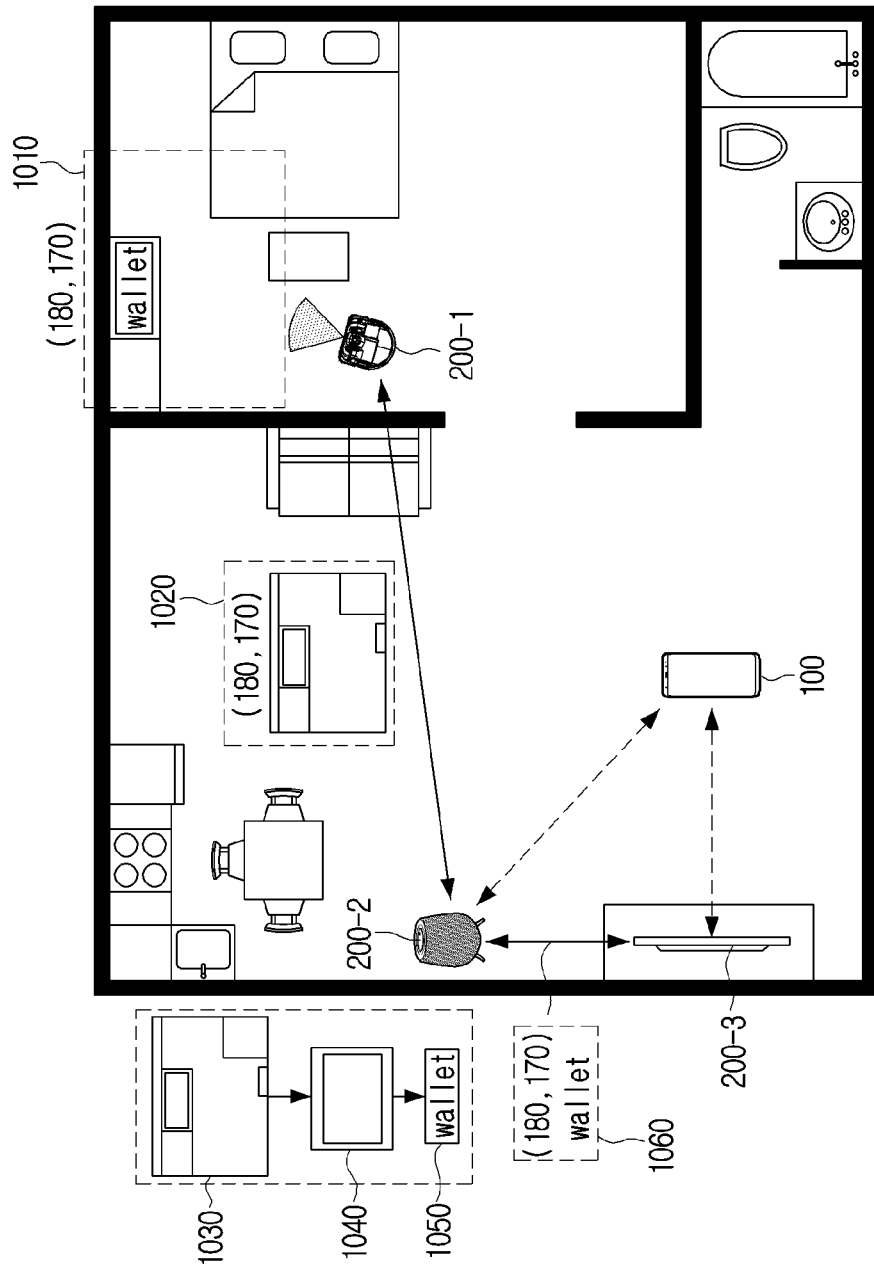
FIG. 10 is a diagram for illustrating performance of a recipe according to an embodiment of the disclosure.
Figure 11:
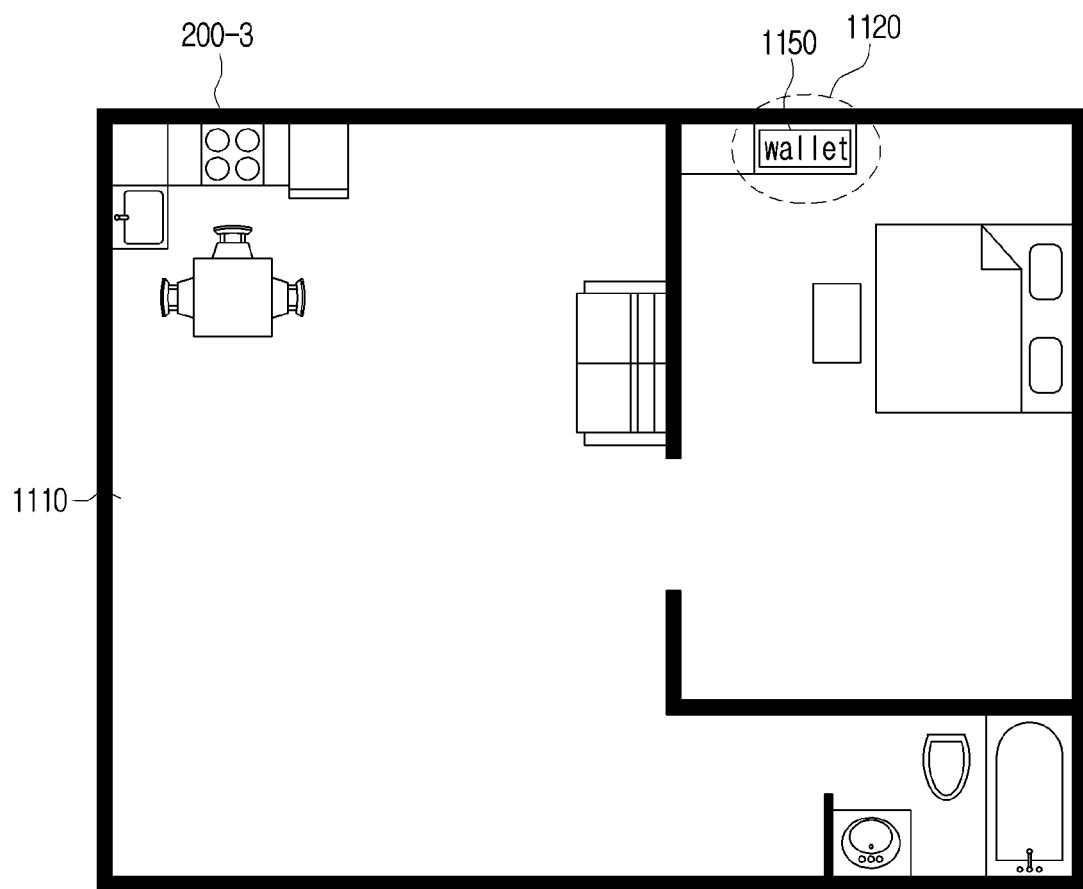
FIG. 11 is a diagram for illustrating performance of a recipe according to an embodiment of the disclosure.

FIG. 9 to FIG. 11 are diagrams for illustrating performance of a recipe according to an embodiment of the disclosure.

Referring to FIG. 9 to FIG. 11, the plurality of electronic apparatuses 200-1 to 200-3 may perform unit functions according to the received signals for performing unit functions. Here, it will be assumed that the first to third unit functions are a moving function, a camera function, and a location identification function, the fourth to fifth unit functions are an image crop function and an object recognition function, and the sixth to seventh unit functions are a map function and a display function.

First, referring to FIG. 9, the first electronic apparatus 200-1 may move its location through the moving function and acquire an image for the surrounding environment of the moved location of the first electronic apparatus 200-1 through the camera function. Also, in this case, the first electronic apparatus 200-1 may acquire location information by detecting the location wherein the image was acquired through the location identification function.

For example, the first electronic apparatus 200-1 may move to a random location through the moving function, acquire an image 910 in the moved location through the camera, and acquire a coordinate value of (200, 150) as location information of acquiring the image 910 through the location identification function.

In this case, the first electronic apparatus 200-1 may transmit data 920 acquired by performing the first to third unit functions to the second electronic apparatus 200-2 performing the fourth unit function performed in the next order in the recipe A. For example, the data 920 acquired at the first electronic apparatus 200-1 may be transmitted to the second electronic apparatus 200-2 via the electronic apparatus 100, or transmitted directly to the second electronic apparatus 200-2. Alternatively, it is also possible that the second electronic apparatus 200-2 directly accesses the data through the network address of the data 920 acquired at the first electronic apparatus 200-1 and brings the data.

Then, the second electronic apparatus 200-2 may divide an image 930 included in the data 920 acquired at the first electronic apparatus 200-1 in object units through the image crop function and acquire a divided image 940, and recognize that the object 950 included in the divided image 940 is "a bed" through the object recognition function.

Then, the second electronic apparatus 200-2 may transmit information on the object 950 to the electronic apparatus 100, and the processor 130 of the electronic apparatus 100 may determine whether the information on the object 950 received through the communicator 110 is "a wallet" which is the subject of the object finding service according to the recipe A. As illustrated in FIG. 9, the processor 130 may determine that the object 950 is "a bed" and not "a wallet" according to the received information, and in this case, the processor 130 may control the communicator 110 to transmit a signal controlling to continuously perform the first to third unit functions to the first electronic apparatus 200-1.

Referring to FIG. 10, the first electronic apparatus 200-1 may move to another location through the moving function, acquire an image 1010 in the moved location through the camera, and acquire a coordinate value of (180, 170) as location information of acquiring the image 1010 through the location identification function. In this case, data 1020 acquired according to performing a unit function at the first electronic apparatus 200-1 may be transmitted to the second electronic apparatus 200-2.

Then, the second electronic apparatus 200-2 may divide an image 1030 included in the data 1020 acquired at the first electronic apparatus 200-1 in object units through the image crop function and acquire a divided image 1040, and recognize that the object 1050 included in the divided image 1040 is "a wallet" through the object recognition function.

In this case, data 1060 acquired according to performing the fourth to fifth unit functions at the second electronic apparatus 200-2 may be transmitted to the third electronic apparatus 200-3 performing the sixth unit function in the next order in the recipe A. Here, the data 1060 may include information on the object 1050 and location information. That is, the data 1060 may include data that is acquired according to a unit function performed in at least one of the first electronic apparatus 200-1 or the second electronic apparatus 200-2.

Referring to FIG. 11, the third electronic apparatus 200-3 may locate the object 1150 included in the received data 1060 in the specific location 1120 corresponding to the coordinate value of 180, 170 (location information) included in the data 1060 received on the map 1110 through the map function, and display the object 1150 in the specific location 1120 on the map 1110 through the display function.

According to an embodiment of the disclosure as above, as the plurality of electronic apparatuses 200-1 to 200-3 perform combined unit functions in the recipe in association with one another, a service according to the recipe can be provided to a user. In this case, provision of a new service different from the conventional technology becomes possible as a plurality of unit functions are combined, and there is an economic effect in that only electronic apparatuses that can perform necessary unit functions need to be provided without having to replace all electronic apparatuses for using a new service.

FIG. 12A to FIG. 12C are diagrams for illustrating information on unit functions according to an embodiment of the disclosure. Here, information on unit functions may be expressed in a data exchange format such as a markup language like xml, etc., or JavaScript Object Notation (JSON), etc. However, this is merely an embodiment, and information on unit functions may be implemented in various data formats.

Referring to FIG. 12A to FIG. 12C, in each of the plurality of electronic apparatuses 200-1 to 200-3, information on each unit function 1210 to 1230 may be drafted and generated as various source codes. Here, the information on each unit function 1210 to 1230 may be standardized so that it can be compatibly used in various electronic apparatuses.

If a case wherein unit functions that can be performed at the first electronic apparatus 200-1 are the camera function, the display function, and the image crop functions is assumed, the information on unit functions 1210 may be generated in the first electronic apparatus 200-1 as illustrated in FIG. 12A.

Specifically, in the information on unit functions 1210, "unit fuction name" may refer to an item indicating a name (or an identifier) of a unit function. Meanwhile, "service url" may refer to an item indicating a network address for a unit function. Also, "capability" may refer to an item indicating performance information for the unit function. For example, "fps: 60" may indicate that the maximum value of the frame processing speed per second is 60, and "resolution: 1920*1080" may indicate that the maximum value of the resolution is Full-HD which is 1920*1080. Meanwhile, "method" may refer to an item that indicates a method such as "GET" which performs a unit function and brings or requests transmission of the acquired data, "POST" which performs a unit function or makes data transmitted, "websocket" which transmits data in real time, etc.

If a case wherein unit functions that can be performed at the second electronic apparatus 200-2 are the camera function, the moving function, and the location identification functions is assumed, the information on unit functions 1220 may be generated in the second electronic apparatus 200-2 as illustrated in FIG. 12B. Also, if a case wherein unit functions that can be performed at the third electronic apparatus 200-3 are the display function, the object recognition function, and the map functions is assumed, the information on unit functions 1230 may be generated in the third electronic apparatus 200-3 as illustrated in FIG. 12C. As the content described in FIG. 12A can be applied in the same way, overlapping contents will be omitted.

FIG. 13 is a diagram for illustrating information on a recipe according to an embodiment of the disclosure.

Referring to FIG. 13, information on the recipe 1310 stored in the electronic apparatus 100 may be drafted and generated as various source codes. Here, the information on the recipe 1310 may be standardized so that it can be compatibly used in various electronic apparatuses. Also, the information on the recipe 1310 may be received through a server such as an app market and stored in the memory 120.

Specifically, in the information on the recipe 1310, "jobs" may refer to an item indicating a unit function performed and a relation among a plurality of unit functions (i.e., whether a plurality of unit functions are performed in parallel or sequentially, or repeated, etc.). Meanwhile, "run" is an item indicating a network address and a method, etc. as specific information for a unit function performed, "require" is an item indicating request information for a unit function, and "priority" may refer to an item indicating priority information.

Figure 14:
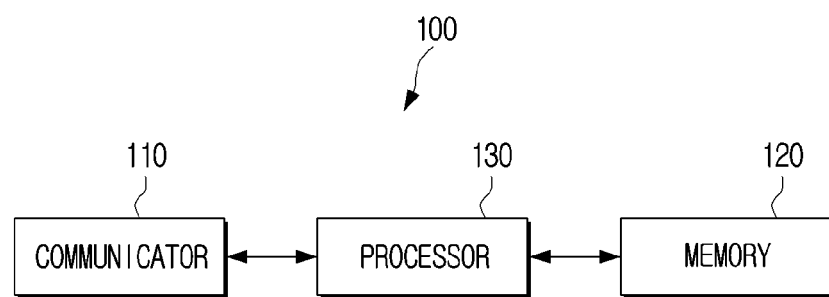
FIG. 14 is a block diagram for illustrating components of an electronic apparatus according to an embodiment of the disclosure.

FIG. 14 is a block diagram for illustrating components of an electronic apparatus according to an embodiment of the disclosure, and FIG. 15 is a block diagram for illustrating additional components of an electronic apparatus according to an embodiment of the disclosure.

Referring to FIG. 14, the electronic apparatus 100 may include a communicator 110, a memory 120, and a processor 130.

The communicator 110 may transmit and receive various types of data with various types of external devices (e.g.: a user terminal device like a smartphone, etc., a server, etc.) according to various wired or wireless communication methods. Here, the communicator 110 may perform direct communication with an external device or perform communication with an external device by going through (or relaying) another external device through various communication networks.

The communicator 110 may receive information from an external device and transmit the received information to the processor 130. Also, the communicator 110 may transmit information to an external device according to control of the processor 130.

For this, the communicator 110 may include a network interface according to a wired or wireless communication method or a network chip. Here, the network interface may include circuitry according to each communication method, and may further include an antenna, etc. in the case of a wireless communication method. For example, the communicator 110 may include at least one of a Wi-Fi chip using a WiFi (Wi-Fi) communication method, a Bluetooth chip using a Bluetooth communication method, an NFC chip using a near field communication (NFC) communication method, a wireless communication chip using a mobile communication method (e.g.: long-term evolution (LTE), LTE Advance (LTE-A), 5th Generation (5G), code division multiple access (CDMA), and wideband CDMA (WCDMA)), or an infrared communication chip using an infrared communication method. Further, the communicator 110 may include at least one of an Ethernet module performing wired communication or a USB module. Meanwhile, the communicator 110 is not limited to the aforementioned embodiment, and it may be modified to perform communication according to communication methods that newly appear according to development of technologies.

The memory 120 is a component for storing an operating system (OS) for controlling the overall operations of the components of the electronic apparatus 100 and various data related to the components of the electronic apparatus 100.

For this, the memory 120 may consist of hardware that temporarily or permanently stores data or information. For example, the memory 120 may be implemented as at least one hardware among a non-volatile memory, a volatile memory, a flash memory, a hard disk drive (HDD) or a solid-state drive (SSD), a RAM, a ROM, etc.

In the memory 120, at least one instruction, programs, or data necessary for the operations of the electronic apparatus 100 or the processor 130 may be stored. Here, an instruction is a code unit instructing an operation of the electronic apparatus 100 or the processor 130, and it may have been drafted in a machine language that a computer can understand. Meanwhile, a program may be a set of a series of instructions that perform a specific task in a task unit. Data may be state information of bit or byte units that can indicate texts, numbers, images, etc.

Also, in the memory 120, various information such as information detected by the sensor 160, information processed by the processor 130, and information for an operation that the electronic apparatus 100 is performing, etc. may be stored. The information stored in the memory 120 may be accessed by the processor 130, and for example, reading/recording/correction/deletion/update, etc. of instructions, programs, or data stored in the memory 120 may be performed by the processor 130.

The processor 130 may be implemented as a generic-purpose processor such as a central processing unit (CPU), an application processor (AP), etc., a graphic-dedicated processor such as a graphic processing unit (GPU), a vision processing unit (VPU), etc., and an artificial intelligence-dedicated processor such as a neural processing unit (NPU), etc. Also, the processor 130 may include a volatile memory for loading at least one instruction or module.

Referring to FIG. 15, the electronic apparatus 100 may further include at least one of a display 140, an input interface 150, a sensor 160, and a speaker 170, other than the communicator 110, the memory 120, and the processor 130.

The display 140 is a device that visually outputs information or data. The display 140 may display an image frame in one area or the entire area of the display 140 that can be operated with pixels. At least a part of the display 140 may be combined with at least one of the front surface area, the side surface area, or the rear surface area of the electronic apparatus 100 in the form of a flexible display. A flexible display may be characterized in that it can be curved or bent or rolled without damage through a substrate that is thin and flexible like paper.

The input interface 150 may receive various user commands and transmit them to the processor 130. That is, the processor 130 may recognize a user command input from a user through the input interface 150. Here, a user command may be implemented in various ways such as a touch input (a touch panel) of a user, a key (a keyboard) or a button (a physical button or a mouse, etc.) input, a user voice (a microphone), etc.

Specifically, the input interface 150 may include, for example, at least one of a touch panel, a pen sensor, a key, or a microphone. A touch panel may use, for example, at least one method among a capacitive method, a decompressive method, an infrared method, or an ultrasonic method. For this, the touch panel may include a control circuit. In addition, the touch panel may further include a tactile layer, and provide a tactile response to a user. Meanwhile, the pen sensor may be, for example, a part of the touch panel, or include a separate sheet for recognition. The key may include, for example, a physical button, an optical key, or a keypad. The microphone may directly receive a user voice and acquire an audio signal by converting a user voice which is an analog signal into digital by a digital conversion part.

The sensor 160 may refer to an element that detects the quantity or change of various physical signals (e.g.: the temperature, light, sound, chemical material, electricity, magneticity, pressure, etc.). Here, a detected signal may be converted into data in a format that can be interpreted by the processor 130 by the sensor 160 or the processor 130.

The sensor 160 may be implemented as various sensors such as a camera, a microphone, a proximity sensor, an illumination sensor, a temperature sensor, a humidity sensor, a motion sensor, a ToF sensor, a GPS sensor, etc.

For example, a camera may divide a light into pixel units, detect the strength of the light for red (R), green (G), and blue (B) colors for each pixel, convert the strength of the light into an electronic signal, and acquire data expressing the color, the shape, the contrast, etc. of the object. Here, the type of the data may be an image having R, G, and B color values for each of a plurality of pixels. A microphone may detect a sound wave like a user's voice, convert the sound wave into an electronic signal, and acquire data. Here, the type of the data may be audio signals in various formats. A proximity sensor may detect presence of an adjacent object, and acquire data regarding whether an adjacent object exists or whether an adjacent object is close. An illumination sensor may detect the light amount (or the brightness) regarding the surrounding environment of the electronic apparatus 100 and acquire data for the illumination. A temperature sensor may detect the temperature of a subject object or the temperature of the surrounding environment of the electronic apparatus 100 (e.g.: the indoor temperature, etc.) according to heat radiation (or photons). Here, the temperature sensor may be implemented as an infrared camera, etc. A humidity sensor may detect the amount of vapor in the air through various methods such as change of colors due to a chemical reaction in the air, change of the ion amount, electromotive force, change of electric currents, etc., and acquire data for the humidity. A motion sensor may detect the moving distance, the moving direction, the tilting, etc. of the electronic apparatus 100. For this, the motion sensor may be implemented as a combination of an acceleration sensor, a gyro sensor, a geomagnetic sensor, etc. A time-of-Flight (TOF) sensor may detect the flight time during which various electromagnetic waves (e.g.: an ultrasonic wave, an infrared ray, a laser, etc.) having a specific speed return after they are emitted and acquire data for the distance (or the location) with a subject. A global positioning system (GPS) sensor may receive radio signals from a plurality of satellites, each calculate the distance with each satellite by using the transmission time of the received signal, and acquire data for the current location of the electronic apparatus 100 by using triangulation with respect to the calculated distance.

However, the aforementioned implementation example of the sensor 160 is merely an embodiment, and the disclosure is not limited thereto, and it is possible that the sensor 160 is implemented as various types of sensors.

The speaker 170 may directly output not only various types of audio data for which various processing operations such as decoding or amplification, noise filtering, etc. were performed by an audio processor but also various kinds of notification sounds or voice messages as sounds.

Meanwhile, in the aforementioned embodiment, explanation was made by dividing the roles of the electronic apparatus 100 and the plurality of other electronic apparatuses 200-1 to 200-3 for the convenience of explanation, but the electronic apparatus 100 of the disclosure may be included in one of the plurality of electronic apparatuses 100, 200-1 to 200-3 as an electronic apparatus performing a unit function. In this case, as described above, if it is identified that the electronic apparatus 100 can perform at least one unit function among a plurality of unit functions included in a recipe, the electronic apparatus 100 may perform the identified unit function. With the same purport, the contents described in the drawings such as FIG. 14 and FIG. 15, etc. can also be applied to the other electronic apparatuses 200-1 to 200-3, and thus overlapping contents will be omitted.

Figure 16:
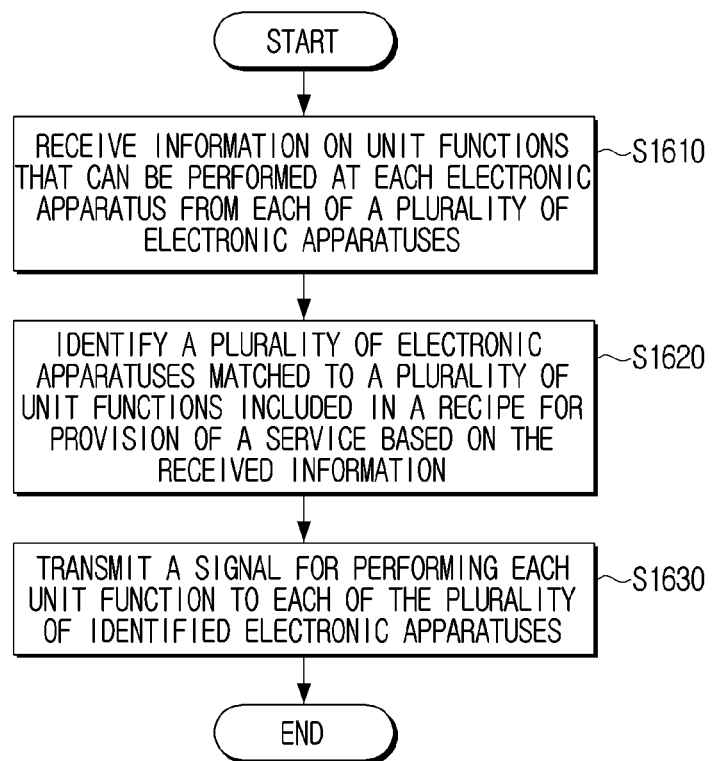
FIG. 16 is a diagram for illustrating a flow chart according to an embodiment of the disclosure.

FIG. 16 is a diagram for illustrating a flow chart according to an embodiment of the disclosure.

A controlling method of an electronic apparatus according to an embodiment of the disclosure includes the steps of receiving information for a unit function that can be performed at each electronic apparatus 200-1 to 200-3 from each of a plurality of electronic apparatuses 200-1 to 200-3 (S1610), identifying a plurality of electronic apparatuses matched to the plurality of unit functions included in a recipe for provision of a service based on the received information (S1620), and transmitting a signal for performing each matched unit function to each of the plurality of identified electronic apparatuses 200-1 to 200-3 (S1630).

Specifically, information for a unit function that can be performed at each electronic apparatus 200-1 to 200-3 may be received from each of a plurality of electronic apparatuses 200-1 to 200-3 in operation S1610. For this, network connection between the electronic apparatus 100 and the plurality of electronic apparatuses 200-1 to 200-3 may be constructed.

Then, based on the received information, the plurality of electronic apparatuses 200-1 to 200-3 matched to the plurality of unit functions included in the recipe for provision of a service may be identified in operation S1620.

Specifically, it may be identified whether the plurality of unit functions included in the recipe exist among the plurality of unit functions included in the received information. Here, the recipe may include a plurality of unit functions combined for provision of a service, and the recipe may be stored in the memory 120 of the electronic apparatus 100. In this case, a recipe including a plurality of unit functions selected through a user's command may be generated and stored in the memory 120 of the electronic apparatus 100, or a recipe received from a server may be stored in the memory 120 of the electronic apparatus 100.

Then, if it is identified that the plurality of unit functions included in the recipe exist, the plurality of electronic apparatuses 200-1 to 200-3 matched to the plurality of unit functions included in the recipe may be identified among the plurality of electronic apparatuses 200-1 to 200-3.

Here, in the controlling method according to the disclosure, in case another unit function performed in association with one unit function included in the recipe exists, one electronic apparatus that can perform the one unit function and the another unit function among the plurality of electronic apparatuses 200-1 to 200-3 may be identified as an electronic apparatus matched to the one unit function and the another unit function. Here, association may indicate a relation wherein a unit function and another unition function are performed simultaneously, or performed sequentially at different times in one electronic apparatus.

For this, in the controlling method according to the disclosure, it may be identified whether another unit function performed in association with a unit function exists for each of the plurality of unit functions included in the recipe based on request information.

Here, the request information may include information indicating another unit function performed in association with at least one function among the plurality of unit functions included in the recipe for provision of a service. Meanwhile, the request information may be included in the recipe or exist as separate information from the recipe, and the request information may be stored in the memory 120 of the electronic apparatus 100.

Meanwhile, priority may be set for at least one unit function among the plurality of unit functions included in the recipe according to an embodiment of the disclosure.

Here, in case a plurality of electronic apparatuses 200-1 to 200-3 that can perform the unit function of which priority has been set exist among the plurality of unit functions included in the recipe, the score of each of the plurality of identified electronic apparatuses 200-1 to 200-3 may be calculated based on the performance information of the unit function that can be performed at each electronic apparatus received from each of the plurality of identified electronic apparatuses 200-1 to 200-3.

Then, an electronic apparatus having the highest calculated score among the plurality of identified electronic apparatuses 200-1 to 200-3 may be identified as an electronic apparatus matched to the unit function of which priority has been set.

Then, a signal for performing each unit function matched to each of the plurality of identified electronic apparatuses 200-1 to 200-3 may be transmitted in operation S1630.

As a specific example, a signal for performing the first unit function among the plurality of unit functions may be transmitted to the first electronic apparatus 200-1 that can perform the first unit function among the plurality of identified electronic apparatuses 200-1, 200-2.

Then, a signal for performing the second unit function among the plurality of unit functions may be transmitted to the second electronic apparatus 200-2 that can perform the second unit function among the plurality of identified electronic apparatuses 200-1, 200-2 based on data acquired by performing the first unit function. Here, the data acquired according to performing the first unit function may be used in performing the second unit function. For example, if a case wherein the first unit function is a camera function and the second unit function is a display function is assumed, an image acquired through the camera according to performing the first unit function may be used in being displayed on the display which is the second unit function.

Here, the data acquired according to performing the first unit function may be transmitted from the first electronic apparatus 200-1 to the second electronic apparatus 200-2 via the electronic apparatus 100, or transmitted from the first electronic apparatus 200-1 to the second electronic apparatus 200-2.

For example, the data acquired according to performing the first unit function may be transmitted from the first electronic apparatus 200-1 to the second electronic apparatus 200-2 via the electronic apparatus 100. Specifically, in case the first electronic apparatus 200-1 transmits the data acquired according to performing the first unit function to the electronic apparatus 100, based on the data being received from the first electronic apparatus 200-1, the electronic apparatus 100 may transmit the received data to the second electronic apparatus 200-2. Accordingly, the data acquired at the first electronic apparatus 200-1 may be transmitted from the first electronic apparatus 200-1 to the second electronic apparatus 200-2 via the electronic apparatus 100.

As an example different from the above, the data acquired according to performing the first unit function may be directly transmitted from the first electronic apparatus 200-1 to the second electronic apparatus 200-2. For this, a signal controlling to transmit the data acquired at the first electronic apparatus 200-1 to the second electronic apparatus 200-2 may be transmitted to the first electronic apparatus 200-1. Accordingly, the data acquired at the first electronic apparatus 200-1 may be transmitted from the first electronic apparatus 200-1 to the second electronic apparatus 200-2 without going through the electronic apparatus 100.

Meanwhile, according to an embodiment of the disclosure, if it is identified that a plurality of electronic apparatuses 200-1 to 200-3 that can perform the plurality of unit functions included in the recipe exist after the aforementioned operation S1620, a user interface (UI) indicating that provision of a service corresponding to the recipe is possible may be displayed on the display 140.

Here, the UI is for indicating that provision of a service corresponding to the recipe is possible (i.e., for notifying to a user that the electronic apparatus is in a ready state wherein execution of the plurality of unit functions included in the recipe is possible), and the UI may include visual information such as texts, images, etc. For example, the UI may be implemented in the form of a visual feedback (e.g.: edge lighting) displayed in one area of the display 140 (e.g.: an area corresponding to a corner, etc.). Also, the UI may be implemented in a form such as a pop-up message displayed in one area of the display 140 (e.g.: an area corresponding to the center, etc.). In addition, the UI may be implemented in a form like a notification bar displayed in one area of the display 140 (e.g.: the upper end area). However, this is merely an embodiment, and the UI may provide sound information such as voices, notification sounds, etc. through a speaker, or provide tactile information such as vibration, etc. through a haptic motor.

Here, the UI may include an object for executing the recipe. In this case, the controlling method may include the step of, if a user command selecting the object is received, transmitting a signal for performing each matched unit function to each of the plurality of identified electronic apparatuses 200-1 to 200-3. That is, in this case, a signal for performing each matched unit function may be transmitted to each of the plurality of identified electronic apparatuses 200-1 to 200-3, as described in the operation S1630.

The various embodiments of the disclosure may be implemented as software including instructions stored in machine-readable storage media, which can be read by machines (e.g.: computers). Here, the machines refer to apparatuses that call instructions stored in a storage medium, and can operate according to the called instructions, and the apparatuses may include the electronic apparatus according to the aforementioned embodiments (e.g.: the electronic apparatus 100). In case an instruction is executed by the processor 130, the processor 130 may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

Also, the method according to the various embodiments of the disclosure may be provided while being included in a computer program product. A computer program product refers to a product, and it can be traded between a seller and a buyer. A computer program product can be distributed in the form of a machine-readable storage medium (e.g.: a compact disc read only memory (CD-ROM)), or distributed online through an application store (e.g.: PLAYSTORE™). In the case of online distribution, at least a portion of the computer program product may be at least temporarily stored in a storage medium such as a server of a manufacturer, a server of an application store, or a memory of a relay server, or temporarily generated.

Further, each of the components (e.g.: a module or a program) according to the various embodiments may consist of a singular object or a plurality of objects. Also, among the aforementioned corresponding sub components, some sub components may be omitted, or other sub components may be further included in the various embodiments. Alternatively or additionally, some components (e.g.: a module or a program) may be integrated as an object, and perform functions performed by each of the components before integration identically or in a similar manner. Also, operations performed by a module, a program, or other components according to the various embodiments may be executed sequentially, in parallel, repetitively, or heuristically or at least some of the operations may be executed in a different order or omitted, or other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic apparatus comprising:
a communicator;
a memory configured to store information on a recipe including a plurality of unit functions, the plurality of unit functions being combined to provide a service; and
a processor configured to:
receive a user input for performing the recipe; and
based on receiving the user input for performing the recipe:
control the communicator to transmit a signal for performing a first unit function among the plurality of unit functions included in the recipe to a first electronic apparatus matched to the first unit function among a plurality of electronic apparatuses matched to the plurality of unit functions and for transmitting data obtained according to performing the first unit function to a second electronic apparatus, and
control the communicator to transmit a signal for performing a second unit function different from the first unit function among the plurality of unit functions included in the recipe using the data obtained according to performing the first unit function to the second electronic apparatus matched to the second unit function among the plurality of electronic apparatuses matched to the plurality of unit functions, wherein the data obtained according to performing the first unit function being used to perform the second unit function by the second electronic apparatus.

2. The electronic apparatus of claim 1, wherein the electronic apparatus further comprising:
a display; and
wherein the processor is further configured to:
based on receiving, from electronic apparatuses, information for a plurality of unit functions which are capable of being performed at the electronic apparatuses through the communicator, identify whether the plurality of unit functions included in the recipe exist among the plurality of unit functions included in the received information,
based on identifying that the plurality of unit functions included in the recipe exist, identify the plurality of electronic apparatuses matched to the plurality of unit functions included in the recipe,
based on identifying the plurality of electronic apparatuses, control the display to display a user interface (UI) indicating that provision of the service corresponding to the recipe is possible, and
receive the user input for performing the recipe through the UI.

3. The electronic apparatus of claim 2, wherein:
the UI includes an object for executing the recipe, and
the processor is further configured to, based on receiving a user input selecting the object, control the communicator to transmit signals for performing the plurality of unit functions included in the recipe to the plurality of electronic apparatuses matched to the plurality of unit functions in the recipe.

4. The electronic apparatus of claim 2, wherein:
the memory further configured to store information on a first recipe including a plurality of unit functions for provision of a first service and information on a second recipe including a plurality of unit functions for provision of a second service,
the UI includes a first object for executing the first recipe and a second object for executing the second recipe, and the processor is further configured to:
based on receiving user input selecting the first object, control the communicator to transmit signals for performing a plurality of unit functions included in the first recipe to a plurality of electronic apparatuses matched to the plurality of unit functions included in the first recipe, and
based on receiving user input selecting the second object, control the communicator to transmit signals for performing a plurality of unit functions included in the second recipe to a plurality of electronic apparatuses matched to the plurality of unit functions included in the second recipe.

5. The electronic apparatus of claim 2, wherein the processor is further configured to:
based on identifying a plurality of electronic apparatuses which are capable of performing a unit function of which priority has been set among the plurality of unit functions included in the recipe, calculate a score of each of the plurality of identified electronic apparatuses based on performance information of a unit function which are capable of being performed at each of the plurality of electronic apparatuses received from each of the plurality of identified electronic apparatuses, and
identify an electronic apparatus having a highest calculated score among the identified electronic apparatuses as an electronic apparatus that matches to the unit function of which priority has been set.

6. The electronic apparatus of claim 1, wherein the processor is further configured to:
based on a second unit function performed in association with a first unit function included in the recipe existing, identify a first electronic apparatus that can perform the first unit function and the second unit function among the plurality of electronic apparatuses as an electronic apparatus matched to the first unit function and the second unit function.

7. The electronic apparatus of claim 6, wherein:
the memory is further configured to store requirement information that indicates a second unit function performed in association with at least one function among the plurality of unit functions included in the recipe for provision of the service, and
the processor is further configured to: based on the requirement information, identify whether the second unit function performed in association with the at least one unit function exists with respect to each of the plurality of unit functions included in the recipe.

8. The electronic apparatus of claim 1, wherein data that is acquired according to performing the first unit function is transmitted either from the first electronic apparatus to the second electronic apparatus, or from the first electronic apparatus to the second electronic apparatus through the electronic apparatus.

9. The electronic apparatus of claim 1, wherein information on the recipe is received from a server through the communicator and stored in the memory.

10. A controlling method of an electronic apparatus, the method comprising:
storing, in a memory, a recipe including a plurality of unit functions for provision of a service;
receiving a user input for performing the recipe;
based on receiving the user input for performing the recipe, transmitting a signal for performing a first unit function among the plurality of unit functions included in the recipe to a first electronic apparatus matched to the first unit function among a plurality of electronic apparatuses matched to the plurality of unit functions;
and for transmitting data obtained according to performing the first unit function to a second electronic apparatus; and
transmitting the data obtained according to performing the first unit function and a signal for performing a second unit function different from the first unit function among the plurality of unit functions included in the recipe using the data obtained according to performing the first unit function to the second electronic apparatus matched to the second unit function among the plurality of electronic apparatuses matched to the plurality of unit functions, wherein the data obtained according to performing the first unit function being used to perform the second unit function by the second electronic apparatus.

11. The controlling method of claim 10, further comprising:
based on receiving, from electronic apparatuses, information for a plurality of unit functions which are capable of being performed at the electronic apparatuses through a communicator, identifying whether the plurality of unit functions included in the recipe exist among the plurality of unit functions included in the received information,
based on identifying that the plurality of unit functions included in the recipe exist, identifying the plurality of electronic apparatuses matched to the plurality of unit functions included in the recipe, and
based on identifying the plurality of electronic apparatuses, displaying a user interface (UI) indicating that provision of the service corresponding to the recipe is possible,
receiving the user input for performing the recipe through the UI.

12. The controlling method of claim 11, wherein the UI includes an object for executing the recipe, and
wherein the transmitting signals comprises:
based on receiving a user input selecting the object, transmitting signals for performing the plurality of unit functions included in the recipe to the plurality of electronic apparatuses matched to the plurality of unit functions in the recipe.

13. The controlling method of claim 11, further comprising:
storing, in the memory, information on a first recipe including a plurality of unit functions for provision of a first service and information on a second recipe including a plurality of unit functions for provision of a second service, wherein the UI includes a first object for executing the first recipe and a second object for executing the second recipe, and
based on receiving user input selecting the first object, transmitting signals for performing a plurality of unit functions included in the first recipe to a plurality of electronic apparatuses matched to the plurality of unit functions included in the first recipe, and
based on receiving user input selecting the second object, transmitting signals for performing a plurality of unit functions included in the second recipe to a plurality of electronic apparatuses matched to the plurality of unit functions included in the second recipe.

14. The controlling method of claim 11, further comprising:
- based on identifying a plurality of electronic apparatuses which are capable of performing a unit function of which priority has been set among the plurality of unit functions included in the recipe, calculating a score of each of the plurality of identified electronic apparatuses based on performance information of a unit function which are capable of being performed at each of the plurality of electronic apparatus received from each of the plurality of identified electronic apparatuses; and
- identifying an electronic apparatus having a highest calculated score among the identified electronic apparatuses as an electronic apparatus matched to the unit function of which priority has been set.

15. The controlling method of claim 10, further comprising:
- based on a second unit function performed in association with a first unit function included in the recipe existing, identifying a first electronic apparatus that can perform the first unit function and the second unit function among the plurality of electronic apparatuses as an electronic apparatus matched to the first unit function and the second unit function.

16. The controlling method of claim 15, further comprising:
- storing, in the memory, requirement information that indicates a second unit function performed in association with at least one function among the plurality of unit functions included in the recipe for provision of the service, and
- based on the requirement information, identifying whether the second unit function performed in association with the at least one unit function exists with respect to each of the plurality of unit functions included in the recipe.

17. The controlling method of claim 10, wherein data that is acquired according to performing the first unit function is transmitted either from the first electronic apparatus to the second electronic apparatus, or from the first electronic apparatus to the second electronic apparatus through the electronic apparatus.

18. The controlling method of claim 10, wherein information on the recipe is received from a server and stored in the memory of the electronic apparatus.

\* \* \* \* \*